(12) United States Patent
Kowalczyk et al.

(10) Patent No.: US 9,672,400 B2
(45) Date of Patent: Jun. 6, 2017

(54) IMAGING AND PERIPHERAL ENHANCEMENTS FOR MOBILE DEVICES

(71) Applicant: Aila Technologies Inc., Natick, MA (US)

(72) Inventors: Matthew Kowalczyk, Natick, MA (US); Manas Menon, Natick, MA (US); Brian Hack, Natick, MA (US); Davis Foster, Natick, MA (US); Jason Gulbinas, Natick, MA (US); Samuel Harada, Natick, MA (US)

(73) Assignee: Aila Technologies Inc., Natick, MA (US)

( * ) Notice: Subject to any disclaimer, the term of this patent is extended or adjusted under 35 U.S.C. 154(b) by 96 days.

(21) Appl. No.: 14/794,667

(22) Filed: Jul. 8, 2015

(65) Prior Publication Data

US 2016/0012269 A1 Jan. 14, 2016

Related U.S. Application Data

(60) Provisional application No. 62/021,964, filed on Jul. 8, 2014.

(51) Int. Cl.
*G06K 7/10* (2006.01)
*G06K 7/00* (2006.01)
*G06K 7/14* (2006.01)

(52) U.S. Cl.
CPC ......... *G06K 7/146* (2013.01); *G06K 7/10831* (2013.01); *G06K 7/10881* (2013.01); *G06K 2207/1011* (2013.01)

(58) Field of Classification Search
CPC ............ G06K 7/0017; G06K 7/10683; G06K 7/10831; G06K 7/10881; G06K 7/1011;
(Continued)

(56) References Cited

U.S. PATENT DOCUMENTS 4,983,818 A * 1/1991 Knowles ............ G06K 7/10881
235/462.33
5,132,523 A * 7/1992 Bassett ............... G06K 7/10871
235/455
(Continued)

FOREIGN PATENT DOCUMENTS

DE 10107030 A1 * 9/2002 ............. G02B 13/22
WO WO-03104854 12/2003
(Continued)

OTHER PUBLICATIONS

Mirror Case for iPhone, www.mirrorcase.com., <<http://www.mirrorcase.com>> Last Accessed May 31, 2016, 1 page.

*Primary Examiner* — Daniel Walsh
(74) *Attorney, Agent, or Firm* — Mintz Levin Cohn Ferris Glovsky and Popeo, P.C.

(57) ABSTRACT

An image enhancer device for use with an associated mobile electronic device having a digital camera. The image enhancer device includes an image manipulator coupled to a first region of a housing and configured to modify an optical path of the digital camera; an aimer having an aiming element configured to direct at least one aiming light beam towards an object of interest; an illuminator having an illumination element configured to direct at least one illumination light beam from the housing towards the object of interest; and electronics allowing for communication between the image enhancer device and the associated mobile electronic device. The image enhancer device forms a scan angle relative to a field of view of the digital camera of the mobile electronic device and allows for bar code imaging and/or native image processing with the digital camera of the associated mobile electronic device.

29 Claims, 19 Drawing Sheets

(58) Field of Classification Search
CPC .......... G06K 7/146; G02B 7/00; G02B 7/003;
G02B 7/02; G02B 7/021; G02B 7/022
See application file for complete search history.

(56) References Cited

U.S. PATENT DOCUMENTS

| | | | |
|---|---|---|---|
| 5,298,727 A * | 3/1994 | Spratte | G06K 7/10594 |
| | | | 235/462.22 |
| 5,359,669 A | 10/1994 | Shanley et al. | |
| 5,484,994 A * | 1/1996 | Roustaei | G03F 7/705 |
| | | | 235/462.25 |
| 5,783,811 A * | 7/1998 | Feng | G01J 3/51 |
| | | | 235/462.42 |
| 5,793,033 A * | 8/1998 | Feng | G06K 7/10722 |
| | | | 235/462.32 |
| 6,330,975 B1 * | 12/2001 | Bunte | H04N 1/00127 |
| | | | 235/470 |
| 6,545,445 B1 * | 4/2003 | McDermott | F02N 11/0866 |
| | | | 320/103 |
| 6,619,547 B2 | 9/2003 | Crowther et al. | |
| 6,657,749 B1 | 12/2003 | Beeson | |
| 6,712,273 B1 | 3/2004 | Stapleton et al. | |
| 6,758,391 B1 | 7/2004 | Pickens, III | |
| 6,942,152 B1 | 9/2005 | Hepworth | |
| 6,957,769 B2 | 10/2005 | Hepworth et al. | |
| 6,978,038 B2 | 12/2005 | Hepworth et al. | |
| 6,991,159 B2 | 1/2006 | Zenou | |
| 6,995,976 B2 | 2/2006 | Richardson | |
| 6,997,387 B1 | 2/2006 | Hepworth et al. | |
| 7,014,113 B1 | 3/2006 | Powell et al. | |
| 7,028,906 B2 | 4/2006 | Challa et al. | |
| 7,036,735 B2 | 5/2006 | Hepworth et al. | |
| 7,072,974 B2 | 7/2006 | Hepworth et al. | |
| 7,156,311 B2 | 1/2007 | Attia et al. | |
| 7,158,376 B2 | 1/2007 | Richardson et al. | |
| 7,168,621 B2 | 1/2007 | Ghai et al. | |
| 7,185,824 B2 | 3/2007 | Hepworth et al. | |
| 7,204,417 B2 | 4/2007 | Hepworth et al. | |
| 7,220,021 B2 * | 5/2007 | Wang | G02B 27/30 |
| | | | 359/570 |
| 7,260,357 B2 | 8/2007 | Hulvey | |
| 7,353,999 B2 | 4/2008 | Hepworth et al. | |
| 7,380,721 B2 | 6/2008 | Zhang | |
| 7,419,098 B2 | 9/2008 | Hyde et al. | |
| 7,519,239 B2 | 4/2009 | Hepworth et al. | |
| 7,609,512 B2 | 10/2009 | Richardson et al. | |
| 7,621,453 B2 | 11/2009 | Hepworth et al. | |
| 7,628,318 B2 | 12/2009 | Melick et al. | |
| 7,769,917 B1 | 8/2010 | Lee | |
| 7,798,406 B2 | 9/2010 | Powell et al. | |
| 7,933,122 B2 | 4/2011 | Richardson et al. | |
| 7,954,710 B1 | 6/2011 | Lee | |
| 8,001,550 B2 | 8/2011 | Hepworth et al. | |
| 8,011,584 B2 | 9/2011 | Powell et al. | |
| 8,027,889 B1 * | 9/2011 | Maroney | G06Q 20/12 |
| | | | 705/26.61 |
| 8,126,399 B1 | 2/2012 | Lee | |
| 8,215,554 B2 | 7/2012 | Hepworth et al. | |
| 8,240,569 B2 | 8/2012 | Hyde et al. | |
| 8,245,936 B2 | 8/2012 | Thuries et al. | |
| 8,279,544 B1 * | 10/2012 | O'Neill | G02B 7/14 |
| | | | 359/819 |
| 8,292,184 B2 | 10/2012 | Turbovich | |
| 8,295,368 B1 | 10/2012 | Lee | |
| 8,313,018 B2 | 11/2012 | Wang et al. | |
| 8,333,323 B2 | 12/2012 | Richardson et al. | |
| 8,336,761 B1 | 12/2012 | McCloskey | |
| 8,336,778 B2 | 12/2012 | Powell et al. | |
| 8,346,979 B1 | 1/2013 | Lee | |
| 8,347,366 B2 | 1/2013 | Lee | |
| 8,370,220 B1 | 2/2013 | Goodwin, III | |
| 8,371,505 B1 | 2/2013 | Zolotov | |
| 8,371,506 B2 | 2/2013 | Lee | |
| 8,381,985 B2 | 2/2013 | Ferren et al. | |
| 8,385,004 B2 | 2/2013 | Hicks | |
| 8,387,883 B1 | 3/2013 | Marcus et al. | |
| 8,395,894 B2 | 3/2013 | Richardson et al. | |
| 8,408,466 B2 | 4/2013 | Gratton | |
| 8,439,266 B2 | 5/2013 | Kawashima et al. | |
| 8,453,835 B2 | 6/2013 | So | |
| 8,471,812 B2 | 6/2013 | Bunch | |
| 8,483,614 B2 | 7/2013 | Lee | |
| 8,483,758 B2 | 7/2013 | Huang | |
| 8,485,430 B2 | 7/2013 | Qu et al. | |
| 8,497,983 B2 | 7/2013 | Cowburn et al. | |
| 8,500,024 B2 | 8/2013 | He | |
| 8,523,074 B2 | 9/2013 | Marcus et al. | |
| 8,556,179 B2 | 10/2013 | Gillet et al. | |
| 8,593,745 B2 | 11/2013 | O'Neill | |
| 8,596,541 B2 | 12/2013 | Chiu et al. | |
| 8,599,547 B2 | 12/2013 | Richardson et al. | |
| 8,616,450 B2 | 12/2013 | Jelinek | |
| 8,714,453 B2 | 5/2014 | Powell et al. | |
| 8,820,643 B1 | 9/2014 | Lei et al. | |
| 8,857,720 B1 | 10/2014 | Lei et al. | |
| 8,864,031 B1 | 10/2014 | Powell et al. | |
| 8,864,034 B1 | 10/2014 | Lei et al. | |
| 8,910,871 B1 | 12/2014 | Powell et al. | |
| 8,939,363 B1 | 1/2015 | Powell et al. | |
| 8,985,454 B2 | 3/2015 | Hyde et al. | |
| 9,019,420 B2 * | 4/2015 | Hurst | H04M 1/0264 |
| | | | 348/337 |
| 9,027,836 B1 | 5/2015 | Lei | |
| 9,082,034 B2 | 7/2015 | Lei et al. | |
| 9,360,366 B1 * | 6/2016 | Tran | G01J 3/10 |
| 2002/0042699 A1 * | 4/2002 | Tanaka | G06F 3/0386 |
| | | | 703/2 |
| 2002/0065728 A1 * | 5/2002 | Ogasawara | G06Q 20/208 |
| | | | 705/23 |
| 2002/0096566 A1 * | 7/2002 | Schwartz | G06K 7/10742 |
| | | | 235/462.42 |
| 2002/0125322 A1 * | 9/2002 | McCall | G06K 7/10732 |
| | | | 235/462.42 |
| 2002/0143814 A1 | 10/2002 | Hepworth et al. | |
| 2003/0089776 A1 * | 5/2003 | Hennick | G06K 7/10732 |
| | | | 235/454 |
| 2003/0163396 A1 | 8/2003 | Blankevoort et al. | |
| 2003/0163800 A1 | 8/2003 | Zhou et al. | |
| 2003/0192949 A1 * | 10/2003 | Hattersley | G06K 7/10742 |
| | | | 235/462.43 |
| 2004/0019893 A1 | 1/2004 | Hepworth et al. | |
| 2004/0030991 A1 | 2/2004 | Hepworth et al. | |
| 2004/0104268 A1 * | 6/2004 | Bailey | G06Q 20/32 |
| | | | 235/439 |
| 2004/0158604 A1 | 8/2004 | Hepworth et al. | |
| 2004/0163051 A1 | 8/2004 | Hepworth et al. | |
| 2004/0173681 A1 * | 9/2004 | Toyama | G06K 7/10732 |
| | | | 235/454 |
| 2005/0023352 A1 * | 2/2005 | Patel | G06K 7/1098 |
| | | | 235/454 |
| 2005/0082370 A1 | 4/2005 | Frantz et al. | |
| 2005/0087601 A1 * | 4/2005 | Gerst, III | G06K 7/10732 |
| | | | 235/455 |
| 2005/0156022 A1 | 7/2005 | Hepworth et al. | |
| 2005/0284942 A1 * | 12/2005 | Gurevich | G06K 7/10544 |
| | | | 235/462.21 |
| 2007/0297021 A1 * | 12/2007 | Smith | G06K 7/10722 |
| | | | 358/474 |
| 2008/0105745 A1 * | 5/2008 | Lei | G06K 7/10722 |
| | | | 235/462.1 |
| 2008/0105746 A1 * | 5/2008 | Lei | G06K 7/10851 |
| | | | 235/462.11 |
| 2008/0121721 A1 * | 5/2008 | Chen | G06K 7/10831 |
| | | | 235/462.45 |
| 2008/0246439 A1 * | 10/2008 | Tsui | H02J 7/0055 |
| | | | 320/137 |
| 2010/0033612 A1 * | 2/2010 | Hsia | G06K 7/10544 |
| | | | 348/308 |
| 2010/0328420 A1 * | 12/2010 | Roman | H04N 5/2251 |
| | | | 348/14.08 |

(56) References Cited

U.S. PATENT DOCUMENTS

| | | | |
|---|---|---|---|
| 2011/0057606 A1* | 3/2011 | Saunamaki | H02J 7/025 320/108 |
| 2011/0081946 A1* | 4/2011 | Singh | H04M 1/0264 455/556.1 |
| 2011/0212751 A1* | 9/2011 | Havens | G06K 7/10881 455/556.1 |
| 2011/0287808 A1 | 11/2011 | Huang | |
| 2011/0292277 A1* | 12/2011 | Cheng | H04N 5/232 348/371 |
| 2011/0309145 A1 | 12/2011 | Richardson et al. | |
| 2012/0031975 A1 | 2/2012 | Powell | |
| 2012/0061462 A1* | 3/2012 | Shadwell, Jr. | G06K 19/06206 235/375 |
| 2012/0247991 A1 | 10/2012 | Meehan | |
| 2012/0261289 A1 | 10/2012 | Wyner et al. | |
| 2012/0286048 A1* | 11/2012 | Liu | G06K 7/01 235/462.48 |
| 2013/0020229 A1 | 1/2013 | Wyner | |
| 2013/0077235 A1 | 3/2013 | Pawar et al. | |
| 2013/0092562 A1 | 4/2013 | Wyner et al. | |
| 2013/0092733 A1 | 4/2013 | Cameron et al. | |
| 2013/0098990 A1 | 4/2013 | Cameron et al. | |
| 2013/0127309 A1 | 5/2013 | Wyner et al. | |
| 2013/0284808 A1* | 10/2013 | Nubling | G06K 7/10702 235/455 |
| 2013/0328999 A1 | 12/2013 | Roman | |
| 2013/0329115 A1 | 12/2013 | Palmeri | |
| 2014/0099526 A1 | 4/2014 | Powell et al. | |
| 2014/0158769 A1* | 6/2014 | Powell | G06K 7/10811 235/462.06 |
| 2014/0237595 A1* | 8/2014 | Sridhara | H04L 63/1408 726/23 |
| 2014/0249941 A1 | 9/2014 | Hicks et al. | |
| 2014/0339296 A1 | 11/2014 | McAdams et al. | |
| 2014/0369575 A1* | 12/2014 | Riopka | G06K 9/00046 382/127 |
| 2014/0370807 A1 | 12/2014 | Lei et al. | |
| 2015/0021399 A1* | 1/2015 | Gurevich | G06K 7/10732 235/462.21 |
| 2015/0028104 A1 | 1/2015 | Ma et al. | |
| 2015/0031412 A1* | 1/2015 | Quilter | G06F 19/366 455/556.1 |
| 2015/0034726 A1 | 2/2015 | Powell et al. | |
| 2015/0041544 A1* | 2/2015 | Chen | G06K 7/10722 235/462.1 |
| 2015/0045012 A1* | 2/2015 | Siminou | H04M 1/72527 455/419 |
| 2015/0048166 A1* | 2/2015 | Lei | G06K 7/10722 235/462.15 |
| 2015/0048167 A1* | 2/2015 | Russell | G06K 7/0004 235/462.22 |
| 2015/0053765 A1* | 2/2015 | Powell | G06K 7/0004 235/455 |
| 2015/0115034 A1 | 4/2015 | Lei et al. | |
| 2015/0115037 A1 | 4/2015 | Hoobler et al. | |
| 2015/0126244 A1* | 5/2015 | Moran | G06K 9/209 455/556.1 |
| 2015/0126245 A1* | 5/2015 | Barkan | H04M 1/0254 455/556.1 |
| 2015/0129656 A1 | 5/2015 | Powell et al. | |
| 2015/0172522 A1* | 6/2015 | O'Neill | H04N 5/2252 348/240.3 |
| 2015/0177147 A1* | 6/2015 | Mangan | G01N 33/04 250/432 R |
| 2015/0199549 A1* | 7/2015 | Lei | G06K 7/10811 235/462.24 |
| 2015/0220766 A1* | 8/2015 | Russell | G06K 7/10881 235/462.42 |
| 2015/0254485 A1* | 9/2015 | Feng | H04M 1/0202 455/556.1 |
| 2015/0261988 A1 | 9/2015 | Lei et al. | |
| 2015/0317503 A1* | 11/2015 | Powell | G06K 7/10831 235/455 |
| 2015/0338885 A1 | 11/2015 | Hoobler et al. | |
| 2015/0341533 A1* | 11/2015 | Yoshida | G02B 7/023 348/207.1 |
| 2015/0356336 A1* | 12/2015 | Hoobler | G06K 7/089 235/455 |
| 2015/0371072 A1* | 12/2015 | Liou | G06K 7/1098 235/375 |
| 2016/0012269 A1* | 1/2016 | Kowalczyk | G06K 7/146 235/462.21 |
| 2016/0188932 A1* | 6/2016 | Powell | G06K 7/10564 235/462.42 |
| 2016/0188940 A1* | 6/2016 | Lu | G06K 7/10722 235/462.41 |
| 2016/0205298 A1* | 7/2016 | Zhou | A61B 3/12 348/78 |
| 2016/0248951 A1* | 8/2016 | Fletcher | H04M 1/21 |
| 2016/0300092 A1* | 10/2016 | Gifford | G06K 7/10821 |

FOREIGN PATENT DOCUMENTS

| | | |
|---|---|---|
| WO | WO-2006060096 A1 | 6/2006 |
| WO | WO-2012012468 A1 | 1/2012 |

* cited by examiner

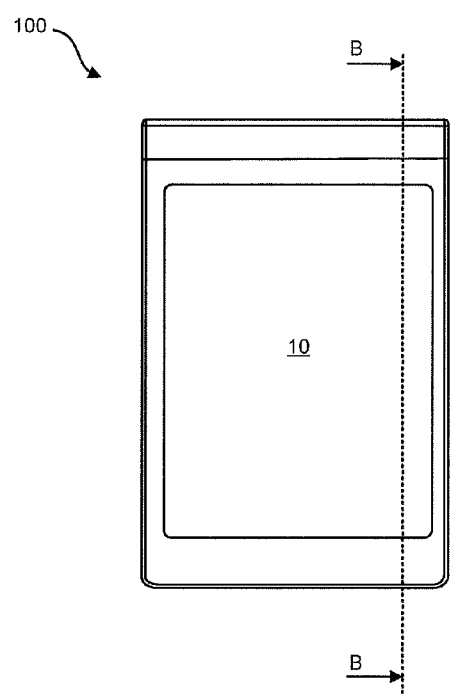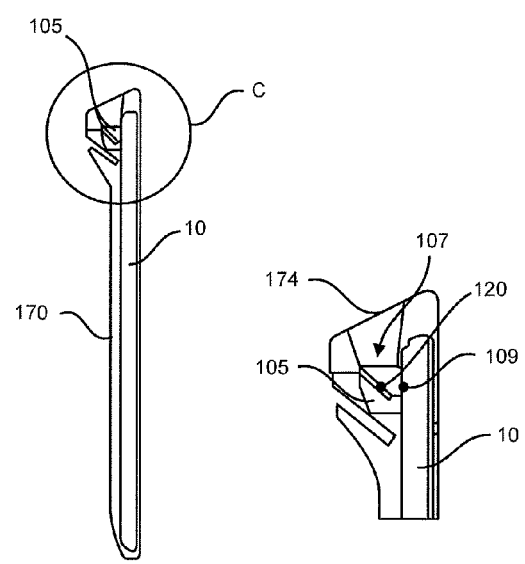
FIG. 7A  FIG. 7B  FIG. 7C

IMAGING AND PERIPHERAL ENHANCEMENTS FOR MOBILE DEVICES

CROSS-REFERENCE TO PRIORITY APPLICATION

The present application claims the benefit of priority to U.S. Provisional Patent Application Ser. No. 62/021,964, Filed Jul. 8, 2014, entitled Imaging and Peripheral Enhancements for Mobile Devices," the full disclosure of which is incorporated herein by reference.

FIELD

The subject matter described herein relates to imaging and peripheral enhancements for mobile devices.

BACKGROUND

Point of sale (POS) terminals, price scanners, and handheld devices used by sales associates in places like retail establishments often incorporate dedicated bar code readers (or bar code scanners) to optically sense a bar code image and produce an electronic signal corresponding to the sensed image. A variety of dedicated bar code readers exist. Dedicated bar code readers typically include one or more illuminating light sources, an aiming light source, an imaging sensor, and electronics to process and interpret the data received. Generally, these readers can operate quickly and reliably for scanning bar codes on merchandise, but have limited interactive and communication capabilities and can be expensive, particularly when they are of the 2D variety.

SUMMARY

In some aspects there are provided systems, devices, and methods for scanning.

In some aspects, there is provided an image enhancer device for use with an associated mobile electronic device having a digital camera, the image enhancer device including a housing; an image manipulator coupled to a first region of the housing configured to modify an optical path of the digital camera; an aimer having an aiming element configured to direct at least one aiming light beam towards an object of interest; an illuminator having an illumination element configured to direct at least one illumination light beam from the housing towards the object of interest; and electronics allowing for communication between the image enhancer device and the associated mobile electronic device. The image enhancer device forms a scan angle relative to a field of view of the digital camera of the mobile electronic device and allows for bar code imaging and/or native image processing with the digital camera of the associated mobile electronic device.

The aiming element can include a first LED light source, the illuminator element includes a second LED light source, and the image manipulator has a first mirrored surface. The electronics can allow for communication from the associated mobile electronic device through a native port on the associated mobile electronic device, the native port being an audio port, a lightning port, or a USB port. The electronics can further allow for harvesting of energy through the native port. The harvested energy can be stored in a super capacitor of the device. The electronics can further receive power from an external source, and further distribute it to the mobile device. The communication can be bi-directional over an audio port on the associated mobile electronic device.

The image manipulator can receive light directed towards the first region of the housing from the object of interest and reflects the light towards a second region of the housing. The first region and the second region of the housing can be arranged at an angle to one another. The aimer can direct the at least one aiming light beam from the first region of the housing through an aperture in the housing. Incoming light can be directed toward the image manipulator and reflect at an angle relative to the incoming light into a lens or image sensor of the digital camera of the associated mobile electronic device between the aimer and the illuminator. The image manipulator can reside between the aimer and the illuminator. The first region of the housing can allow incoming light to reflect onto the image manipulator and allow outgoing light from the aimer and the illuminator to exit the housing and toward the object of interest. The second region of the housing can be a generally planar surface configured to be positioned flush, adjacent, angled relative to, or otherwise aligned with a chassis of the associated mobile electronic device. The planar surface of the second region can be positionable relative to the chassis of the associated mobile electronic device such that the image manipulator is generally centered and aligned over the lens or image sensor of the digital camera of the associated mobile electronic device and the first region faces at an angle to the chassis such that the at least one aiming light beam and the at least one illuminating light beam are directed away from the device and toward the object of interest. When the second region of the housing is positioned against the chassis of the mobile device and optically aligned with the camera, the first region of the housing can be oriented such that incoming light directed towards the image enhancer device reflects onto the image manipulator and is redirected towards the digital camera of the associated mobile electronic device.

The at least one aiming light beam can be emitted through an aimer aperture extending through a wall in the housing of the device on the first region of the housing. The at least one illumination light beam can be emitted through an illuminator aperture extending through the wall of the housing. The illuminator aperture and the aimer aperture can be the same or different apertures. A plane of the aimer aperture and a plane of the illuminator aperture can be the same plane, parallel planes, or non-parallel planes. An angle can be formed between a plane of the second region of the housing and the planes of the aimer aperture and the illuminator aperture. The angle can be at least about 15°, 20°, 25°, 30°, 35°, 40°, 45°, 50°, 55°, 60°, 65°, 70°, 75°, 80°, 85°, 90°, 95° or greater degrees. The angle can be fixed or mechanically adjustable. Incoming light can be redirected by the image manipulator at an angle that is about 15°, 20°, 25°, 30°, 35°, 40°, 45°, 50°, 55°, 60°, 65°, 70°, 75°, 80°, 85°, 90°, 95° degree angle from an original direction. The scan angle can be 90 degrees from a direction that the digital camera is facing.

The aimer can be housed within an interior volume of the housing and the aiming element can include a lens, a pinhole element defining a pinhole, and an aiming light source coupled to a printed circuit board. The lens can be oriented near a first region of the housing a distance away from the pinhole element. The pinhole element can be coupled to or integrated with an inner surface of the housing between the lens and the aiming light source. The aiming element can further include a diffuser positioned between the pinhole element and the aiming light source. The lens can be placed at its focal point relative to the aiming light source, which is a distance away from the pinhole and has a measured spread of the beam of light produced by the aiming element. The distance can be about 1 mm to about 4 mm and the spread can be about 1 mm to about 40 mm measured between 0 mm and 200 mm from a distal-most point on a surface of the lens. The lens can be placed with its focal point at the pinhole, which is a distance away from the light source and has a measured spread of the beam of light produced by the aiming element. The distance can be about 1 mm to about 5 mm and the spread can be about 1 mm to about 40 mm measured between 0 mm and 200 mm from a distal-most point on a surface of the lens. The lens can be placed with its focal point at an emissive surface of the light source or at an offset relative to the light source. The lens can be a collimating lens, which upon leaving the collimating lens causes the light rays to converge and then diverge. The lens can be placed offset from its focal point relative to the aiming light source which is a distance away from the pinhole and has a measured spread of the beam of light produced by the aiming element. The distance can be about 1 mm to about 5 mm and the spread can be about 1 mm to about 30 mm measured between 0 mm and 200 mm from a distal-most point on a surface of the lens. The light beam can be relatively uniform and obscures individual characteristics of the aiming light source.

The aimer can be housed within an interior volume of the housing and the aiming element can include a lens, a pinhole element defining a pinhole, a light pipe, and an aiming light source coupled to a printed circuit board. The lens can be oriented near a first region of the housing a distance away from the pinhole element. The pinhole element can be coupled to or integrated with an inner surface of the housing between the lens and the aiming light source. The light pipe can be optionally positioned through at least a portion of the pinhole and direct light from the aiming light source through the pinhole of the pinhole element towards the lens. The aiming element can further include a diffuser positioned between the light pipe and the aiming light source. The lens can be placed with its focal point at the pinhole a distance away from the light source with a light pipe in the path of the light rays between the light source and the pinhole. The light pipe can be shaped such that the light rays having a measured spread pass through the focal point of the lens approximating a point source and the lens is a collimating lens such that projected light rays are approximately parallel to each other.

The illuminator can be housed within an interior volume of the housing and the illumination element can include an illumination light source coupled to a printed circuit board and optionally a light pipe and/or a diffusing element. The diffusing element, if present, can cover the illumination light source. The light pipe, if present, can be positioned between the illumination light source and the diffusing element. The image manipulator can be coupled to the first region of the housing positioned between the aimer and the illuminator.

The electronics can allow for communication of data and/or power with electronics of the associated mobile electronic device. The image enhancer device can harvest power from a native port on the associated mobile electronic device. The native port can be a universal audio port and power can be harvested using signals exiting the associated mobile electronic device through the universal audio port from any of the audio channels. The power harvesting can occur simultaneously with unidirectional or bidirectional communication through the native port or through an alternative port. The data protocol or the communication can include one or more of FSK, PSK, QAM, RS-232. The image enhancer device can further include a connector member configured to engage the audio port upon association of the device with the mobile electronic device.

A speed of scanning can be improved and allow for fast processing of the object of interest. The speed of scanning and/or fast processing of the object of interest can be aided by image processing optimizations being run on the associated mobile electronic device. The speed of scanning can be increased by one or more of pixel selection, image cropping, pixel averaging, field of view framing, exposure time, focal distance, focal depth, zoom, frame rate, color and brightness control, or a combination thereof. The device can control settings of the camera of the associated mobile electronic device to optimize pixel selection, image cropping, pixel averaging, field of view framing, exposure time, focal distance, focal depth, zoom, frame rate, color and brightness control, or a combination thereof. The device can limit a focal range over which autofocus of the digital camera on the associated mobile device operates. The device can incorporate field of view cropping or affects image processing features on the digital camera on the associated mobile device. The device can reduce a field of view such that fewer pixels are processed to improve system responsiveness and increase performance. One or more speed and quality optimizations can be incorporated in either or both the device and the associated mobile electronic device. The one or more speed and quality optimizations can include one or more of pixel skipping, pixel averaging, interpolating, and upscaling. The device can be scaled for use with multiple digital cameras. Scaling the device for use with multiple digital cameras can improve resolution in a scan area and provide a broader focal range. The illuminator light source and/or the aimer light source can be an on-axis design having a small point source and diffused. The illuminator light source and/or the aimer light source can be an off-axis design. The device can further include a dedicated battery. The device can harvests energy and have no need for an external power source. The energy can be harvested from an audio port. The energy harvested can be thermal, electromagnetic, solar, and/or mechanical energy. The device can further include a proximity sensor used to provide distance information to the camera to support focusing. The proximity sensor can be dedicated hardware. The device can leverage sensing features of the digital camera of the associated mobile electronic device. The device can further include motion detection.

In an interrelated aspect, described is an image enhancer device for use with an associated mobile electronic device having a digital camera that includes an aimer having an aiming element configured to direct at least one aiming light beam towards an object of interest.

The device can be used for bar code imaging and/or native image processing. The object of interest can include a 2D bar code, a 3D bar code, a QR code, an image-based scanning code, or and optically-readable code. The object of interest can code general product or item information. The associated mobile electronic device can be a mobile phone, smartphone, tablet computer, personal digital assistant (PDA), enterprise digital assistant (EDA), laptop computer, voice over IP (VoIP) handset, wireless device, Bluetooth device, handheld or portable computer, netbook, notebook, or smart book.

The aimer can provide illumination of the object of interest. The at least one aiming light beam generated by the aiming element can project a visual cue on the object of interest. The visual cue can include one or more dots, boxes, dashed lines, cross-hairs, or other visual cue. The visual cue can be a static visual cue or a dynamic visual cue including a pulse, strobe, continuous flash, semi-continuous flash, or combination thereof. The aiming element can be an optical element including one or more of an aiming light source coupled to a printed circuit board and, a lens, a pinhole element, a light pipe, a concentrator element, a diffusing element, a light guide, an obstructing element, and a light collimator. The aiming light source can be an LED, OLED, or laser diode. The lens can be a plano-convex lens, aspheric lens, Fresnel lens, or concave lens. The pinhole element can define a pinhole extending through the pinhole element sized to block light emanating from the aiming light source that is not usable by the lens. The light pipe can capture and concentrate a broader angle of light emitted by the light source and emit captured and concentrated light through an aperture minimizing divergence without trading off light throughput. The light pipe can be tubular or conical and have an inner surface that reflects light. The diffusing element can be a sheet or section of material with surface properties that causes light to diffuse through its volume. The material can include LEXAN or acrylic with surface textures, internal voids, or cast-in reflective materials designed to scatter light. The light collimator can cause light rays to be approximately parallel. The light guide can guide light using refraction and/or reflection. The lens can be of aspherical shape and distally offset from its focal point causing light rays extending through the lens to cross and mix.

The device can further include an illuminator having an illumination element configured to direct at least one illumination light beam towards the object of interest. The illuminator can be bounded by an aperture to provide clear aiming direction. The at least one illumination light beam can overlap the at least one aiming light beam. The illumination element can further include a diffusing element and/or a light pipe to control the at least one illumination light beam. The illumination element can be an illumination light source coupled to a printed circuit board and including one or more of a light emitting diode (LED), an organic light emitting diode (OLED), and a laser diode. The illumination light source can be of a color or spectrum of colors. The illuminator can further include an occluding element configured to generate a beam pattern with the at least one illumination light beam forming an aiming beam. An illumination light source of the mobile electronic device can provide an illumination light beam towards the object of interest.

The device can further include a light pipe to shape the illumination light beam emanating from the mobile electronic device illumination light source. The device can further include an image manipulator configured to modify an optical path of the digital camera. The image manipulator can be an optical element configured to shape and/or redirect an angle of a path of the beam of light impinging upon the image manipulator into the digital camera of the associated mobile electronic device. The optical element can be a planar element having one or more of a curved reflective surface, a curved mirror, a flat reflective surface, a straight mirror, a lens, a prism, and a fiber. The image manipulator can include one, two, three, or more optical surfaces.

The device can further include electronics allowing for communication of data and/or power with the electronics of the associated mobile electronic device. The device can further include a connector member configured to engage a native port on the associated mobile electronic device including an audio port, a USB port, USB mini, USB-C, USB micro, or other port on the associated mobile device. Communication can be provided via an audio port of the associated mobile electronic device. The communication can be two-way communication. The communication can harvest power from a native port on the associated mobile electronic device, wherein the native port is a universal audio port and power is harvested using a signal exiting the associated mobile device via through the audio port of the associated mobile device from any of the audio channels. Power harvesting can occur simultaneously with unidirectional or bidirectional communication through the native port or through an alternative port. The communication can have a data protocol including one or more of FSK, PSK, QAM, and RS-232.

The device can further include one or more proximity sensors configured to sense when the object of interest is in proximity to the image enhancer device, is within a field of view of the image manipulator, within an illuminated region emanating from the illuminator, within a beam of the aimer, and/or within proximity of a scan window of the device. Information can be provided by the one or more proximity sensors to electronics of the device and can be used to start, influence, or send an input regarding a scan. The one or more proximity sensors can be an IR/photodiode, radar, LIDAR, stereo camera, motion sensing sensor, structured light sensor, acoustic sensor, dedicated sensor, or image-based sensor. The device can include one or more touch sensors or capacitive sensors. The device can include one or more inputs for user control and/or operational status of the device. The one or more inputs can allow direct control of the device.

The device can include one or more attachment elements configured to reversibly couple the device to the associated mobile electronic device in an orientation relative to the digital camera on the associated mobile electronic device. The one or more attachment elements can be integrated with a housing of the device or are separate from the image enhancer device and the mobile electronic device. The one or more attachment elements can include a scan window. The scan window can optically isolate light emitted by the illuminator and light emitted by the aimer from incoming light. The aimer, the illuminator, and the image manipulator can be independently housed or grouped together in a singular housing of the image enhancer device.

In an interrelated aspect, described is an image enhancer device for use with an associated mobile electronic device having a digital camera including an illuminator having an illumination element configured to direct at least one illumination light beam towards the object of interest and a light pipe. The image enhancer device forms a scan angle relative to a field of view of the digital camera of the mobile electronic device and allows for bar code imaging and/or native image processing with the digital camera of the mobile electronic device.

In an interrelated aspect, described is an image enhancer device for use with an associated mobile electronic device having a digital camera including an image manipulator configured to modify an optical path of the digital camera. The image enhancer device forms a scan angle relative to a field of view of the digital camera of the mobile electronic device and allows for bar code imaging and/or native image processing with the digital camera of the mobile electronic device.

In an interrelated aspect, described is an image enhancer device for use with an associated mobile electronic device having a digital camera including electronics allowing for communication of data and/or power between the electronics and the associated mobile electronic device. The image enhancer device forms a scan angle relative to a field of view of the digital camera of the mobile electronic device and allows for bar code imaging and/or native image processing with the digital camera of the mobile electronic device.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

BRIEF DESCRIPTION OF THE DRAWINGS

In the drawings,

FIGS. 7A-7E show various views of an implementation of an attachment element for associating the device of FIG. 2A to a mobile device.

DETAILED DESCRIPTION

Figure 1A:
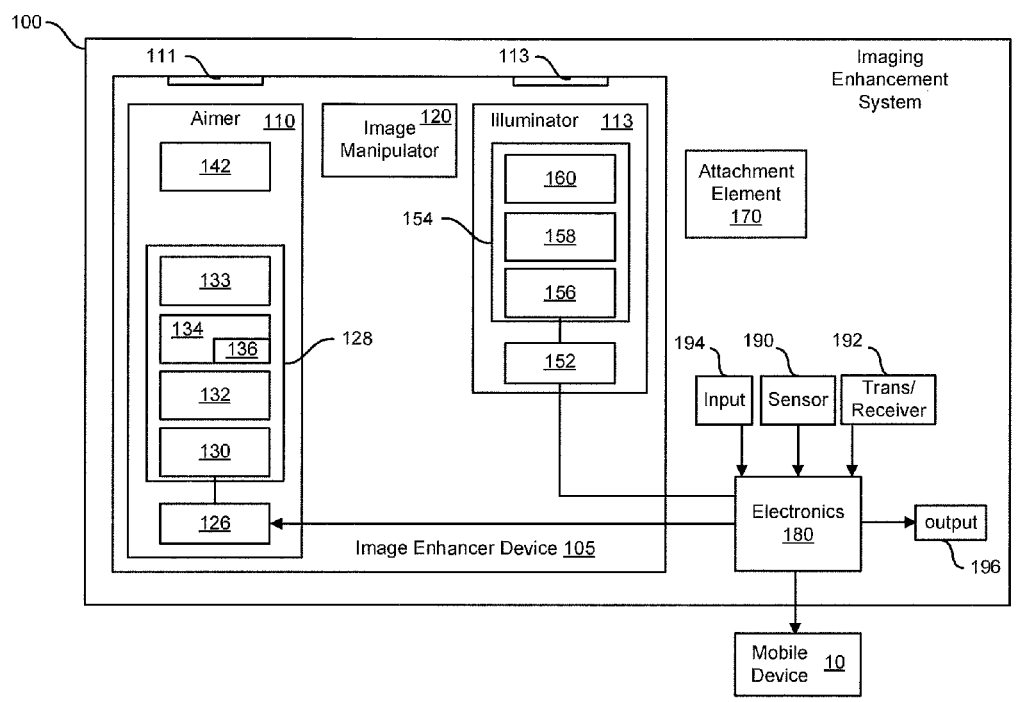
FIG. 1A shows a box diagram of an implementation of an imaging enhancement system.

Dedicated bar code scanners house optics, imaging sensors, and electronics to process images and extract the bar code string. 2D bar code scanners in particular can be expensive, driven by the costs and complexities of the individual components and their overall integration. There is a need for mobile devices, such as tablet computers and smartphones, to provide extended capabilities such as bar code scanning and payment processing such that they can be used for interactions between sales associates and customers, or for customer self-service, in commercial and/or public settings. Further, there is a need for devices that provide these extended capabilities across a range of operating systems (e.g., Android, iOS, Windows, Chrome, etc.) with provisions for mechanical packaging and protection, power and data connectivity, and an application programming interface (API) and software development kit (SDK) to allow native applications to interface with the device. There is a need for devices that provide a high degree of mobility, ease of operation, and low cost.

The subject matter described herein may in some implementations provide one or more advantages, as well as others. The devices described herein may be configured to be used in association with a mobile device having light sensing and/or imaging capability, such as a digital camera, in order to enhance, alter, add, and/or otherwise improve the imaging capabilities of the mobile device such that the mobile device can be used as a dedicated bar code scanner. The described devices may provide for a scanning experience that is optimized for 1D and 2D bar codes, QR codes, or other image-based scanning or optically readable codes to collect general product or item information, process payments, facilitate interactions, and support operations in commercial and public settings. The described devices can transform a mobile device into a commercial point of sale system. The described devices can allow for bar code imaging and/or native image processing with the digital camera of the associated mobile electronic device.

Speed and accuracy of bar code processing in commercial settings may be considered primary factors for user satisfaction. Mobile devices with a camera and bar code scanning applications have been shown to perform much slower versus dedicated devices, which can scan bar codes in less than 100 milliseconds. As will be described in more detail below, the devices described herein may improve scanning speed and/or allow for fast processing of the bar codes, and improve accuracy of bar code scanning. The scanning speed and/or fast processing can be via image processing optimizations being run on the mobile device. The devices described herein can incorporate software based image processing such as pixel selection, pixel averaging, field of view framing, and image cropping to improve scan processing efficiency. The devices described herein can control the camera of the associated mobile electronic device to manage exposure time, iso sensitivity, focal distance, focal depth, zoom, frame rate, color and brightness control, or a combination thereof to speed up processing. For example, the system 100 can limit the focal range over which autofocus of the camera on the associated mobile device operates. Further, the system 100 can incorporate field of view cropping or affect these features on the mobile device camera. For example, reducing the field of view, fewer pixels are processed and system responsiveness improved therein increasing performance at the expense of field of view. Other speed and quality optimizations can be incorporated in either or both the system 100 and the associated mobile device such as pixel skipping, averaging, interpolating, upscaling. Reducing pixel count while staying above minimum resolution thresholds (as dictated by the size of the item being scanned), performance may be preserved without the field of view tradeoff mentioned above. The devices can incorporate or be used in association with a printer, for example, to provide the system with the ability to print receipts. It should be appreciated that any of a variety of peripherals can be used in association with the devices described herein including CC, Magnetic stripe readers, barcode scanners, 3D sensors (leap motion), CC, EMV Smart Card readers, printers, etc.

The ergonomics of the devices described herein may allow for the user to position the device more quickly and more accurately than would be possible for a native mobile device camera. The devices described herein can incorporate an intuitive grip and scan angle, for example 90 degrees from the standard direction that the camera is facing, allowing for quicker and more accurate positioning of the scan. In addition, the devices described herein can include an aimer that provides a visual cue to aid the user in performing a faster scan. The devices described herein may include illumination to provide superior lighting to improve image quality and delivery faster and more accurate scans.

Traditionally, dedicated scan engines have been added to mobile devices to allow for scanning. Due to the power requirements, doing so typically requires the addition of a dedicated battery. Combined, these add size, weight, and cost which are all problematic for devices that are designed for mobility. The devices described herein require considerably less dedicated energy, and may eliminate the battery and use a super capacitor in its place. Furthermore, the dedicated scan engine can be replaced with smaller, lighter, and lower cost components.

It should be appreciated that although the devices, systems and methods described herein are often described in terms of their use with a "mobile device," this is not intended to be limiting. The devices, systems and methods described herein can be used in conjunction with any number of computing devices, including but not limited to mobile phone, smartphone, tablet computer, personal digital assistant (PDA), enterprise digital assistant (EDA), laptop computer, voice over IP (VoIP) handsets, wireless devices, Bluetooth devices, handheld or portable computers, netbooks, notebooks, smart books, and/or any other wireless device including stationary wireless devices. Further, it should be appreciated that use of the term "camera" is also not intended to be limiting and can include a variety of light sensing and/or digital imaging technologies such as a digital camera, digital video camera, light sensing element, image sensor such as a complementary metal-oxide-semiconductor (CMOS) image sensor or charge-coupled device (CCD) type image sensor, and the like. Further, it should be appreciated that the devices and systems described herein can be scaled for use with multiple cameras, for example, in order to improve resolution in the scan area as well as broader focal range (e.g. using the multiple cameras to bracket).

The devices described herein can be used for a variety of applications. The devices and systems described herein can be used by a sales associate, for example at a department store in conjunction with a tablet computer to scan a bar code and get information about a product in the store. It should also be appreciated that although the devices, systems and methods are described herein as being useful for commercial retail purposes, their use is not intended to be limited to only this purpose. For example, the devices described herein can be used in other settings where a bar code scan might be useful such as in healthcare, warehousing, hospitality settings or for personal private use.

Figure 1B:
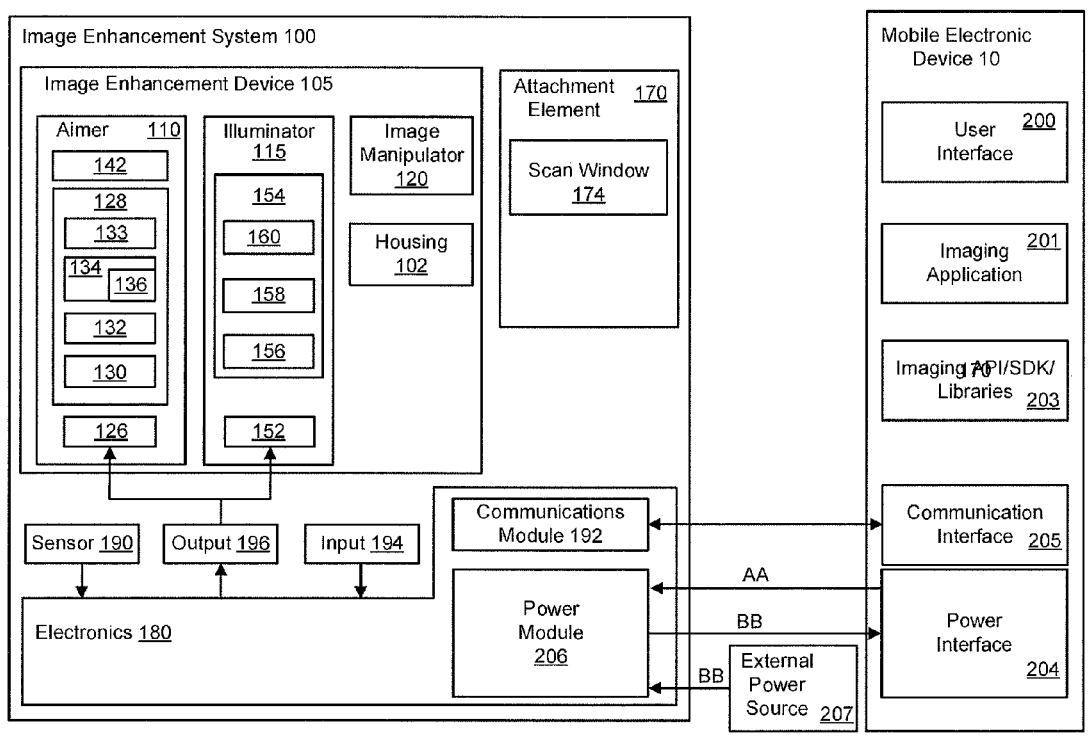
FIG. 1B shows a box diagram of another implementation of an imaging enhancement system.

FIGS. 1A-1B show box diagrams of implementations of an imaging enhancement system 100 configured to be used with or coupled to a mobile device 10 such as a tablet or smartphone or other computing device. The imaging enhancement system 100 can include an image enhancer device 105 having an aimer 110, an illuminator 115, and/or an image manipulator 120, each of which will be described in greater detail below. The aimer 110, the illuminator 115, and/or the image manipulator 120, can be included in the image enhancement device collectively, individually, or in any combination. The aimer 110 can direct at least one aiming light beam away from a first region of the device towards an object of interest. The aimer 110 can generate a very narrow beam onto the object to be scanned, such as a bar code, to visually guide a user towards the appropriate portion of the object to be scanned. The beam generated by the aimer 110 can provide a variety of visual cues, including one or more dot(s), box(es), dashed lines, cross-hairs or other configuration of visual cue. The visual cue can be static, dynamic, or responsive. For example, the visual cue can pulse, strobe, flash continuously or semi-continuously, change brightness, or a combination thereof. Additionally, the visual cue can change modes to provide feedback to the user, such as to indicate a successful scan. Appropriate positioning of the object to be scanned into the field of view can allow for faster, more efficient and more desirable outcomes for a successful bar code scan. The illuminator 115 can direct at least one illumination light beam away from the first region of the device towards the object of interest. The illuminator 115 can create sufficient illumination of the object to be scanned. The image manipulator 120 can be configured to receive light directed towards the first region of the device from the object of interest and reflect the light towards a second region of the device, wherein the first region and the second region of the device are arranged at an angle.

Figure 2A:
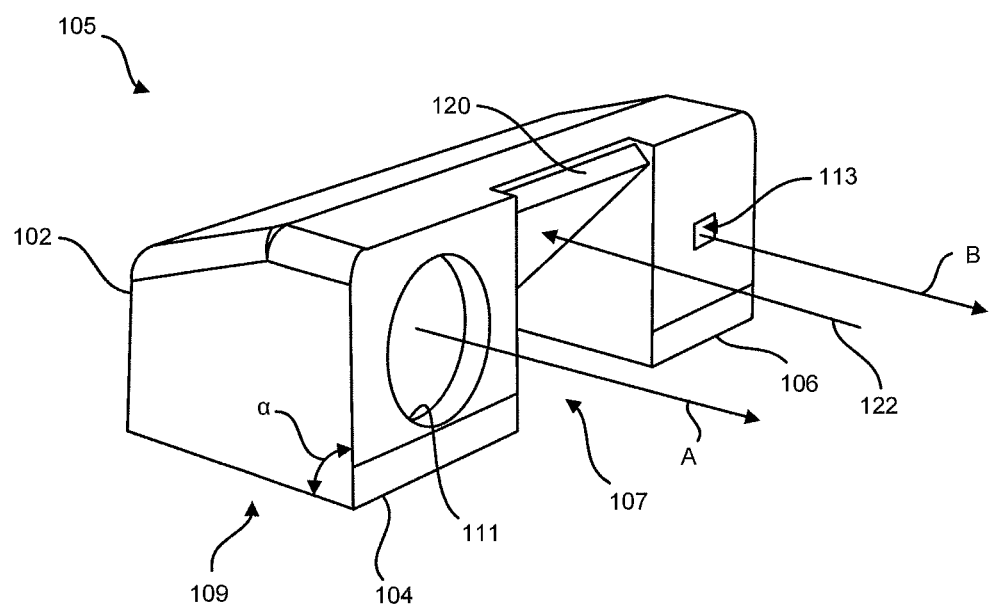
FIG. 2A shows a perspective view of an implementation of an image enhancer device.
Figure 2B:
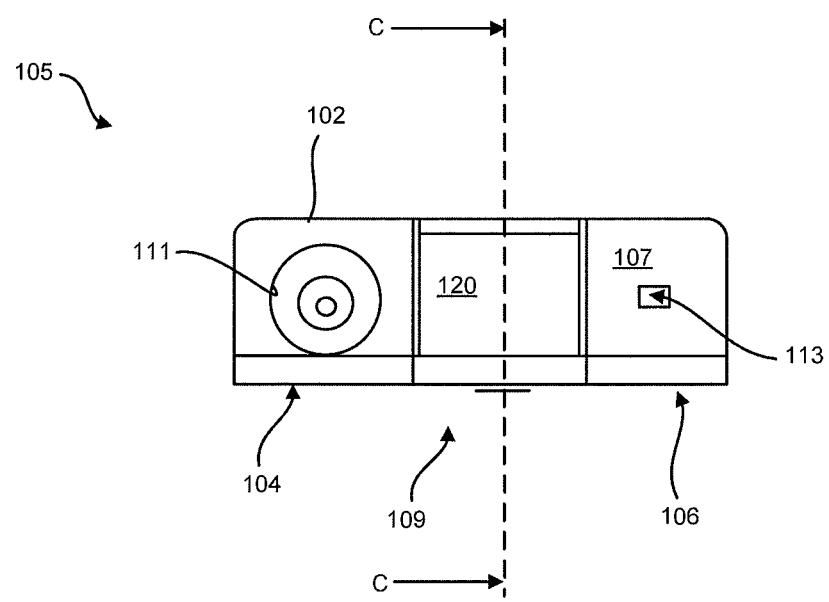
FIG. 2B shows a front view of the device of FIG. 2A.
Figure 2C:
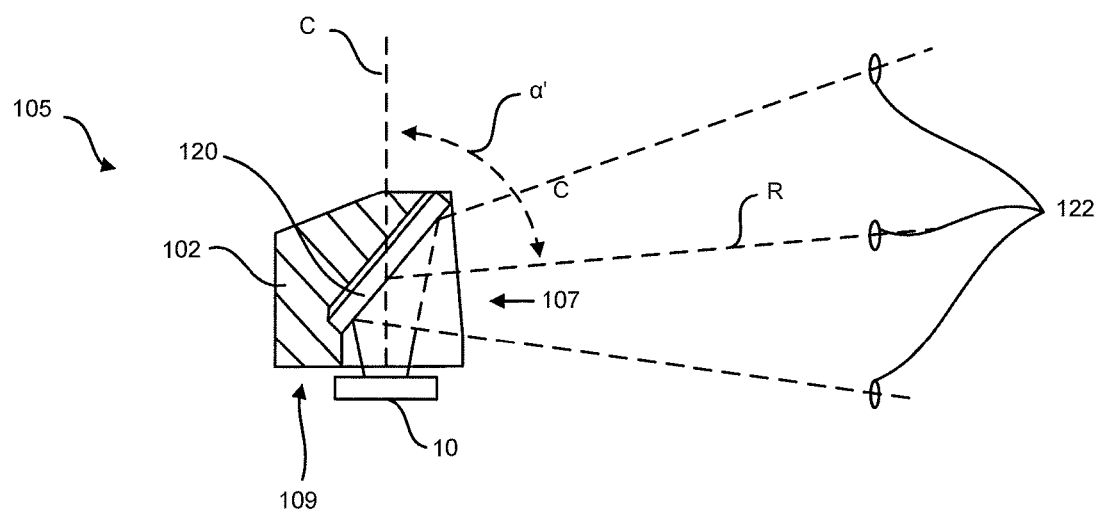
FIG. 2C shows a cross-sectional view of the device of FIG. 2B taken along line C-C.

In some implementations, the aimer 110 can be coupled to a housing 102 such that it directs the at least one aiming light beam from the housing 102, such as through an aperture 111, along the direction of arrow A (see FIG. 2A). The illuminator 115 also can be coupled to the housing 102 such that it directs the at least one illumination light beam from the housing 102, such as through an aperture 113, along the direction of arrow B. The image manipulator 120 can be coupled to the housing 102 such that it modifies the optical path of the camera on the mobile device 10 with which the image enhancer device 105 is used such that the mobile device 10 can be used in a more intuitive and ergonomic way as a bar code scanner. The configuration of the aimer 110 relative to the illuminator 115 relative to the image manipulator 120 as well as all the three relative to the housing 102 can vary. In some implementations, the aimer 110 is positioned on a first side of the image manipulator 120 and the illuminator 115 is positioned on a second, opposite side of the image manipulator 120 such that the aiming beam along arrow A and illumination beam along arrow B can be on either side of the image manipulator 120 and toward an object to be scanned. Incoming light 122 as shown in FIG. 2C can refer to the light rays impinging on the device 105 and/or the image manipulator 120 that compose the visual view of the outside world. The incoming light 122 can be directed toward the image manipulator 120 and reflect at an angle relative to the incoming light into the camera of the mobile device 10 between the aimer 110 and illuminator 115. The aimer 110, illuminator 115, and image manipulator 120 may or may not be contained within the same housing 102.

Again with respect to FIGS. 2A-2C, the image enhancer device 105 can include a first region or a scan side 107 configured to allow for incoming light 122 to reflect onto the image manipulator 120 and to allow for outgoing light from the aimer 110 and the illuminator 115 to exit the image enhancer device 105 and be directed toward the object to be scanned. In some implementations, the scan side 107 of the image enhancer device 105 can include a clear, protective covering or scan window 174 such that the image manipulator 120 and the components of the aimer 110 and the illuminator 115 are protected from damage, debris, and dirt. The scan side 107 of the image enhancer device 105 can mate to, be offset from, parallel to, or at angles up to 45 degrees from the scan window 174. The scan window 174 can be any of a variety of appropriate materials suitable for optics, such as PMMA, polycarbonate, or glass. The scan window 174 can additionally include one or more anti-reflective coatings, color filters, high-pass, low-pass, neutral density filters, anti-glare, polarizing, enhancement films (such as quantum dot films) or any combination thereof. The scan window 174 can be flush with a distal edge of aperture 111, and/or a distal edge of aperture 113, and/or the scan side 107 of the device to optically isolate the light emitted by the illuminator 115, the aimer 110, and the incoming light 122 from one another. This arrangement can minimize internal reflections that pollute the incoming light 122 due to light emitted by the illuminator 115 or the aimer 110 impinging on the scan window 174. Additionally, these internal reflections can illuminate the device internals, which can in turn cause a secondary internal reflection on the scan window 174 further polluting the incoming light 122.

The image enhancer device 105 can also have a second region or camera side 109 that can be a generally planar surface configured to be positioned flush, adjacent, or otherwise aligned with the chassis of the associated mobile device 10. The camera side 109 of the image enhancer device 105 can be positioned parallel to the chassis of the mobile device 10 and aligned with the camera of the mobile device 10 such that at least one or more portions 104, 106 of the camera side 109 lies adjacent the camera such that the image manipulator 120 is generally centered and aligned over the camera of the mobile device 10. The image manipulator 120 can reflect incoming light 122 from the scan side 107 and redirect it to the camera side 109 and into the camera. When the camera side 109 is positioned against the chassis of the mobile device 10, the scan side 107 can be disposed so as to face in a direction relative to the plane of the chassis that can be generally parallel, generally orthogonal, or at an angle to the plane of the chassis as will be described in more detail below.

When the camera side 109 of the image enhancer device 105 is positioned against the chassis of the mobile device 10 and optically aligned with the camera, the scan side 107 of the image enhancer device 105 can be oriented such that the aiming and illuminating light beams directed away from the image enhancer device 105 can be aimed at an object to be scanned or read. Further, when the camera side 109 of the image enhancer device 105 is positioned against the chassis of the mobile device 10 and optically aligned with the camera, the scan side 107 of the image enhancer device 105 can be oriented such that incoming light 122 directed towards the image enhancer device 105 can reflect onto the image manipulator 120 and be redirected towards the camera of the mobile device 10. Still further, when the camera side 109 of the image enhancer device 105 is positioned against the chassis of the mobile device and optically aligned with the camera, the scan side 107 of the image enhancer device 105 can be oriented such that light can enter and exit the image enhancer device 105 while still allowing a user to easily hold and operate the mobile device 10. The user can also easily read the screen of the mobile device 10, if desired. It should also be appreciated that the user need not necessarily view the screen of the mobile device 10 to operate image enhancer device 105.

As shown in FIG. 2A, the camera side 109 of the image enhancer device 105 can be optically aligned with the camera/sensor and can have a plane that lies parallel to a plane of the chassis. The camera side 109 of the image enhancer device 105 can be configured to be positioned against the chassis of the mobile device 10. The aimer 110 emits light through aperture 111. Aperture 111, which extends through a wall of the housing 102 on the scan side 107 of the device, has a plane. The illuminator 115 emits light through aperture 113. Aperture 113, which extends through a wall of the housing 102 on the scan side 107 of the device, also has a plane. The plane of the aimer aperture 111 and the plane of the illuminator aperture 113 can be the same plane, parallel planes, or non-parallel planes. An angle α between the plane of the camera side 109 and the planes of the aimer aperture 111 and the illuminator aperture 113 can be formed (see FIG. 2A). The angle α can vary including at least about 15°, 20°, 25°, 30°, 35°, 40°, 45°, 50°, 55°, 60°, 65°, 70°, 75°, 80°, 85°, 90°, 95° or greater degrees. It should be appreciated that the angle α can be greater than, less than, or between any of these listed angles. This angle α can be fixed or in some implementations it can be adjustable, such as by the user rotating a portion of the device 105 relative to another. The adjustment can be made using a variety of mechanisms including, but not limited to a pivot, hinge, living hinge, 4-bar mechanism or other mechanism or combination thereof. The adjustment mechanism can include one or more of detents, friction locking, and/or snaps to hold the selected angle. The angle α allows a user to easily operate and/or read information on the screen of the mobile device 10 while using the image enhancer device 105 to scan a bar code. It should also be appreciated that the user need not necessarily view the screen of the mobile device 10 to operate image enhancer device 105.

As mentioned above, the image manipulator 120 can be accessed from the scan side 107 of the image enhancer device 105 and oriented such that incoming light 122 can reflect off of the image manipulator 120. The image manipulator 120 can be coupled to the housing 102 at a variety of angles and orientations such that upon associating the system 100 with a mobile device 10, the image manipulator 120 can reflect or redirect the incoming light 122 towards the camera of the mobile device 10. The image enhancer device 105 can redirect the incoming light 122, for example, by about 15°, 20°, 25°, 30°, 35°, 40°, 45°, 50°, 55°, 60°, 65°, 70°, 75°, 80°, 85°, 90°, 95° or other degree angle from the original direction. In some implementations, the image enhancer device 105 can redirect the incoming light 122 by at least about 20° to about 120°. It should be appreciated that the angle can be greater than, less than, or between any of these listed angles.

The image manipulator 120 can be oriented such that it forms an angle α' defined by an incoming ray R directed towards the image manipulator 120 that will eventually impinge on or generally near the center C of the imaging sensor of the mobile device 10 (see FIG. 2C). In some implementations, angle α' can be at least about 15°, 20°, 25°, 30°, 35°, 40°, 45°, 50°, 55°, 60°, 65°, 70°, 75°, 80°, 85°, 90°, 95° or other degree angle. The orientation between the image manipulator 120 and the mobile device 10 allows the user to hold the mobile device 10 at an ergonomic angle relative to the plane of the object to be scanned (e.g. bar code of interest) and optimize the device's use for commercial retail scanning applications. For example, the orientation allows a user to aim the front end or top of the mobile device 10 towards the object to be scanned such that the screen of the mobile device 10 projects toward the user during operation of the system 100.

It should be appreciated that use of the term "image manipulator" is not intended to be limited and that the image manipulator 120 can be any of a variety of optical elements configured to shape and/or redirect the angle of the beam of light impinging upon the image manipulator 120, including, but not limited to one or more straight or curved mirrors, lenses, prisms, fibers, or a combination thereof. In some implementations, the image manipulator 120 can be a planar element having a single reflective surface. In some implementations, the image manipulator 120 can be a mirror. In some implementations, the image manipulator can be a first surface mirror. In some implementations, the image manipulator 120 can be a curved or flat reflective surface. In some implementations, the image manipulator 120 can include one, two, three, or more optical surfaces. In some implementations, the image manipulator 120 is a planar or curved mirror having just one optical surface and may produce a higher quality image on a cost parity basis than, for example, a prism having three optical surfaces. In some implementations, the image manipulator 120 is a prism having two or three optical surfaces. The prism can be formed of glass or a plastic material and can have an index of refraction that is different from the index of refraction of air such that it can bend light. In some implementations, the prism can allow a wider field of view to be captured in a smaller space guided by lower incident angles of light rays traveling within the prism body. In other implementations, the image manipulator 120 is a lens configured to alter the angle of the path of the optics into the camera of the mobile device. The lenses can include plastic and/or glass elements or other material with a different or differing index or indices of refraction from air. The lenses can alter the field of view (FOV), focal length, depth of field and packaging form factor. In some applications of use, the entire camera field of view (FOV) can be used whereas other applications do not require the usage of the entire camera FOV. Reduction in FOV can result in a more spatially compact and ergonomic device. In applications such as bar code scanning, less than the entire FOV of the camera on the mobile device 10 can be used with angles typically in the range of 15-35 degrees of vertical (as shown by the angle between the outermost rays of incoming light 122 in FIG. 2C) and 25-40 degrees of horizontal FOV.

The components of the systems and devices described herein have a generally small form factor, which can improve the ergonomics and aesthetics. For example, the imaging enhancement system 100 and associated mobile device 10 can be held and operated using a single hand while the user's other hand is free to hold the object to be scanned. The user can view the screen on the mobile device 10 while scanning the object of interest and/or can view the object being scanned, for example, just beyond the front end or top of the associated mobile device 10. The small form factor of the device minimally increases the overall weight of the associated mobile device, which facilitates further an ergonomic and/or comfortable grip with a single hand for extended periods and allows ease of operation with a thumb or finger while holding the device.

As mentioned above, the image enhancer device 105 can include an aimer 110. The aimer 110 can allow a user to easily orient the image enhancer device 105 towards an object of interest and project, for example, a focused dot of light onto the target of interest such that a user can quickly and easily position the system 100 relative to the object to be scanned for a proper scan of the bar code to take place. The aimer 110 can be coupled to the image enhancer device 105 such that the aiming light beam generated by the aimer 110 can project away from the image enhancer device 105, for example through the aiming beam window 111 extending through the wall of the housing 102 and exit the scan side 107 of the image enhancer device 105 (shown in FIG. 2A).

Again with respect to FIG. 1, the aimer 110 can include an aiming element 128 coupled to a printed circuit board (PCB) 126. The aiming element 128 can include any of a variety of combinations of one or more optical elements including an aiming light source 130, a lens 132, a pinhole element 134, a light pipe 138, a concentrator element, with or without a diffusing element 142, a light guide, obstructing element, light collimator, etc. The aiming light source 130 of the aimer 110 can include, for example, an LED, OLED, laser diode and the like configured to be electrically connected to the PCB 126. In some implementations, the aimer 110 is optimized for LED light sources as the aiming light source 130. For example, the light pipe 138 can concentrate, channel, and diffuse light, and may have lensed entry and exit surfaces for light shaping and power efficiency. The lens 132 can aid in light collimation and shaping of the light from the light source 130. The lens 132 can be of any of a variety of lenses, for example a plano-convex lens, aspheric lens, Fresnel lens, concave lens, and the like.

The pinhole element 134 can be opaque other than for a pinhole 136 extending therethrough. The pinhole 136 can provide a profile for which the lens 132 can focus on to determine the shape of the aimer beam. Furthermore, a profile size of the pinhole 136 can be chosen to optimize the tradeoff between beam divergence and light transmission. The pinhole 136 can be sized smaller than the aiming light source and therefore better approximate a point source of light from the perspective of the lens 132. For a given light source diameter (D, as defined by pinhole 136) and lens focal length (f), the full beam divergence ($\Theta$) in radians after collimation is: $\Theta = D/f$. Thus, assuming the lens 132 focal length is chosen to capture the light emanating from the pinhole 136 and that the light source 130 has a beam profile wider than the pinhole 136 (and all else equal), this guiding equation presents a trade-off between maximizing light throughput and minimizing beam divergence. The pinhole 136 can be sized to block light emanating from the light source that is not practically usable by the lens 132. The larger the pinhole 136, the more light will transmit, but the earlier the beam may be washed out over longer ranges due to beam divergence. It is desirable to have both high efficiency light transmission and low beam divergence. Furthermore, the light source 130 may be offset from the lens 132 focal point at the pinhole 136 to blur the signature in light sources such as LEDs, by way of the die surface. Further impacting efficiency, light sources such as LEDs often have wide angles of dispersion, typically 120 degrees in configurations without a built-in lens. LEDs that do have narrower angles typically include built-in lenses that can add additional signature to the light profile, which is not ideal as a uniform intensity in the beam pattern can have a more pleasing appearance. However, the light pipe 138 (shown in FIGS. 3C and 3D) can capture and concentrate a broader angle of light emitted by the light source 130 for a given pinhole 136 profile, thus, increasing overall efficiency. The light pipe 138 can capture, concentrate, and emit light from the light source 130 through a smaller aperture and minimize divergence without trading off light throughput. The light pipe 138 can be a tubular, conical, or other volume element having an inner surface that reflects light. This reflection can occur due to total internal reflection (TIR). The diffusing element 142 can aid in light distribution. The diffusing element 142 can be a sheet of material with surface properties that cause diffusion, or a section of material that causes light to diffuse through its volume. Examples can include materials such as LEXAN or acrylic with surface textures, internal voids, or cast-in reflective materials designed to scatter light. A light guide can be any element that guides light, using techniques such as, but not limited to, refraction and/or reflection. An obstructing element can be any opaque or semi-opaque material that can block light. A light collimator can be any element that causes light to collimate, that is, causes the light rays to be approximately parallel.

Now with respect to FIGS. 3A-3D, the aimer 110 can be positioned within a region 124 of the housing 102 configured to hold the PCB 126 electrically coupled to the aiming element 128. The housing region 124 of the aimer 110 can have a variety of configurations and shapes. The housing region 124 can have a first end 144 and a second end 146 and an interior volume 148 extending between the first end 144 and the second end 146. In some implementations, the PCB 126 can be coupled near the first end 144 of the housing region 124 and the lens 132 can be coupled near the second end 146 of the housing region 124 such that the interior volume 148 extends between the PCB 126 and the lens 132 and the lens 132 can be oriented nearer to the scan side 107 of the image enhancer device 105. As mentioned, the aimer 110 can also have a light obstructing feature such as a pinhole element 134 extending into the interior volume 148 of the housing region 124. The pinhole element 134 can be coupled to or integrated with an inner surface of the housing region 124 such that it extends into the interior volume 148 of the housing region 124. The pinhole element 134 can be of a variety of shapes, including but not limited to circular, square, cross, or an "X", the profile of which the user will see projected onto a target. The pinhole element 134 can have a pinhole 136 extending through its thickness. In some implementations, the pinhole 136 extends through the pinhole element 134 near a center region of the pinhole element 134 such that the pinhole 136 is aligned with the center of the interior volume 148 of the housing region 124. The pinhole element 134 can be positioned in a region of the housing region 124 between the first end 144 and the second end 146. The pinhole element 134 can be located nearer to the first end 144 of the housing region 124, but between the lens 132 and the aiming light source 130 (see, e.g. FIG. 3A). The aiming light source 130 can be coupled to the PCB 126, which in turn can be coupled to the housing region 124 near the first end 144. The aiming light source 130 can be aligned with the pinhole 136 through the pinhole element 134. The aimer 110 can also include a diffusing element 142 positioned between the aiming light source 130 and pinhole 136 (see FIGS. 3A and 3C).

Figure 3A:
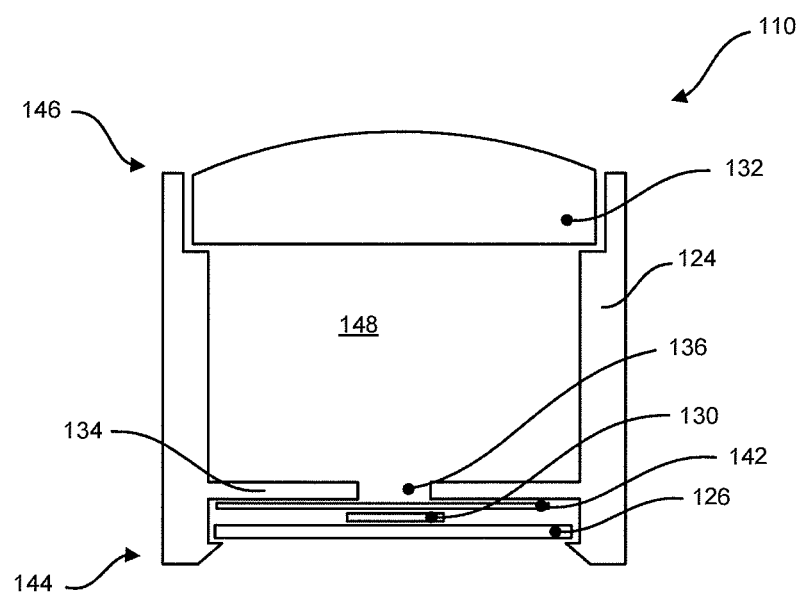
FIGS. 3A and 3B show cross-sectional, schematic views of implementations of an aimer.
Figure 3B:
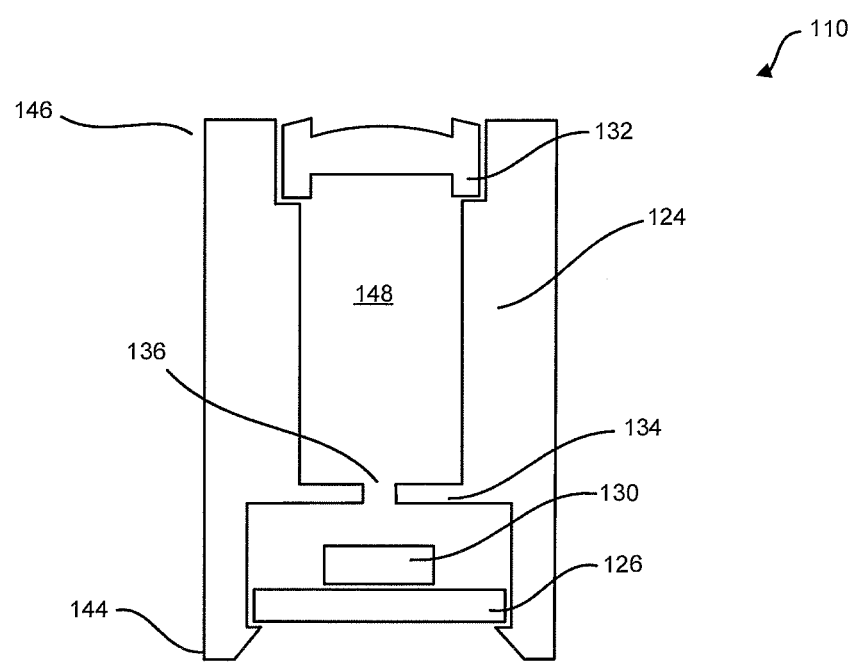
Figure 3C:
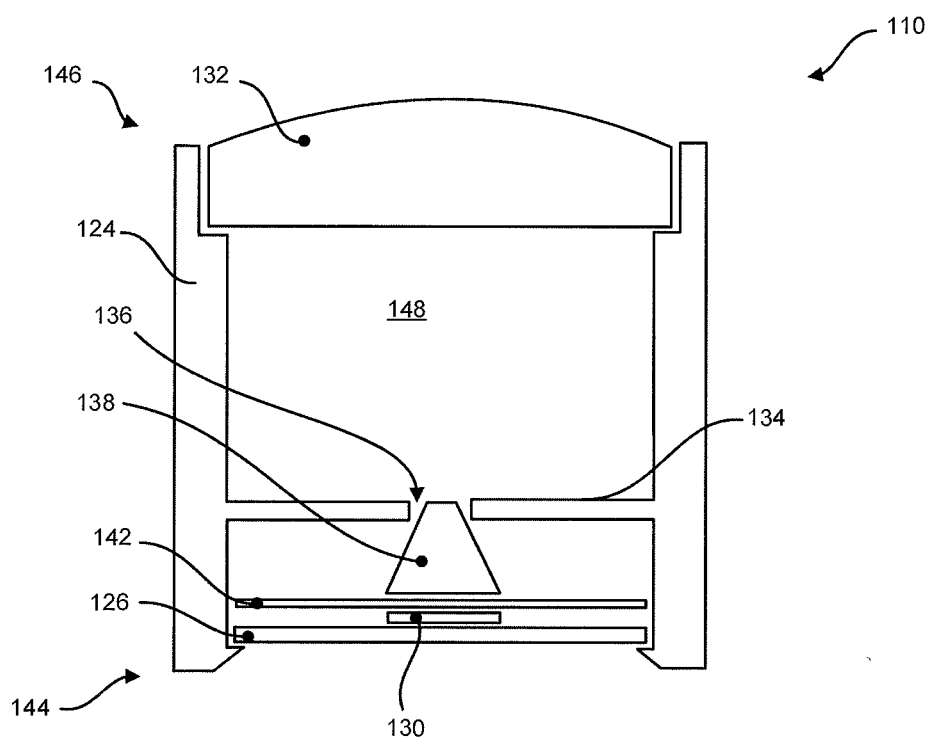
FIGS. 3C-3D show cross-sectional, schematic views of implementations of an aimer having a light pipe.
Figure 3D:
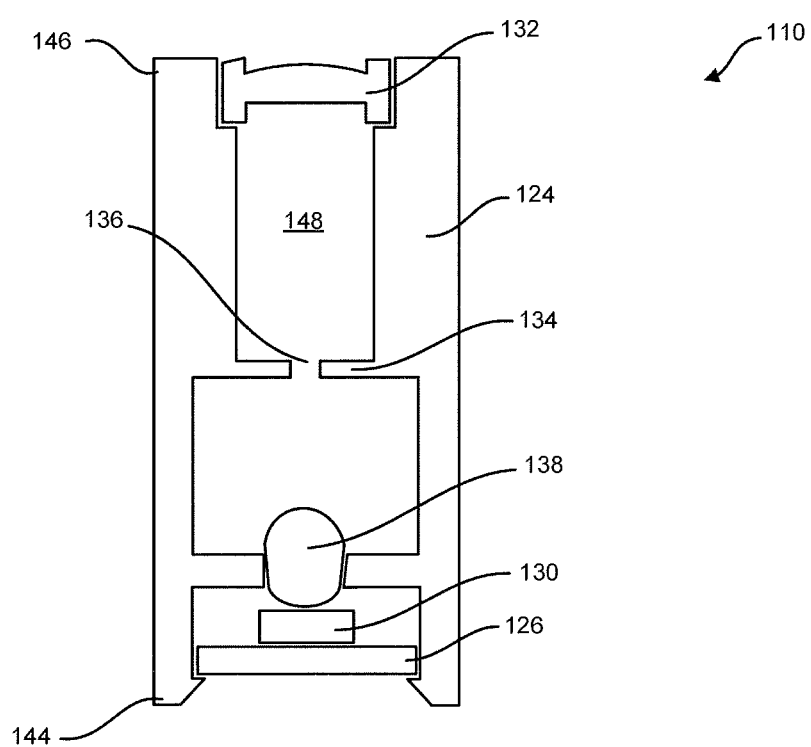

FIG. 3B shows another implementation of an aimer 110 having a PCB 126 coupled near the first end 144 of the housing region 124 and the lens 132 coupled to the second end 146 of the housing region 124. In this implementation, the aimer 110 can include a pinhole element 134 extending into the interior volume 148 of the housing region 124 and a light pipe 138 to reduce the effective light emissive surface area and/or increase the efficiency. The light pipe 138 can be positioned such that light from the aiming light source 130 enters a first end of the light pipe 138 and exits a second end of the light pipe 138 such that the light is directed through the pinhole 136 of the pinhole element 134 and towards the lens 132 coupled to the second end 146 of the housing region 124. The aimer 110 can also include a diffusing element 142 positioned between the aiming light source 130 and the light pipe 138 (see FIGS. 3A and 3C). The light pipe 138 can additionally be shaped in such a way as to increase the efficiency and mix the light rays to remove signature from the light source 130. Features of the light pipe 138 may include but are not limited to a first end that is planar, curved, or shaped and may additionally be smooth or textured, intermediate surfaces that may be angled to provide total internal reflection, intermediate surfaces that may be circular, square, or polygonal in cross section, a second end that may be planar, curved, or shaped, and a second end that may additionally be smooth or textured. Texture may be applied to surfaces of the light pipe 138 and/or internal voids and/or reflective materials may be volumetrically encapsulated within the light pipe 138 to create diffusion effects. The length of the light pipe 138 and size of the first and second ends of the light pipe 138 may also be adjusted. These features and dimensions can be tuned such that the light beam exiting the aimer 110 has a shape and distribution that creates an optimal beam for aiming.

The relative or absolute placement of the components of the aiming element 128 (including one or more of the lens 132, the pinhole element 134, the light pipe 138 and/or the aiming light source 130, etc.) can be varied such that the metrics of one or more of the image plane blur, focal length, beam diameter, beam dispersion, spot size, spot shape, number of spots, brightness, and/or efficiency can be tuned. In some implementations, the lens 132 can be positioned with a focal point at the location of the LED light source or the pinhole 136 to better collimate the light. When the focal point of the lens 132 is positioned at the LED die, the features of the LED die can be visible. It can also be desirable to defocus the image of the LED die by changing the relative position of the lens 132, the pinhole 136 or any combination of the aiming element 128 so that a level of blurring and light shaping can be achieved. When the lens 132 is of aspherical shape, and distally offset from a focal point at the LED die, the rays can cross and there can be better light mixing, reducing the visibility of the LED die features. This can also further concentrate the beam, creating a sharper aiming feature at some distances (see FIG. 5A). Small changes in the offset distance can make large differences in beam sharpness and light mixing. In some cases, intentionally defocusing an aspheric lens that is shaping light through a pinhole, for example, can reduce the illuminated spot size while delivering that same total illumination, and thus, increase the brightness of the aiming beam at some distances. A light pipe 138 can be used to focus the light rays such that they are highly concentrated at the focal point of the lens 132, which may be at the pinhole 136. This can further reduce the visibility of LED die features through light mixing along the length of the light pipe 138, and especially so when the light pipe 138 includes diffusion elements. A light pipe 138 may also be used to focus the light rays at offset distances relative to the focal point of the lens 132 in order to intentionally defocus signature resident within the aiming light source.

Figure 4A:
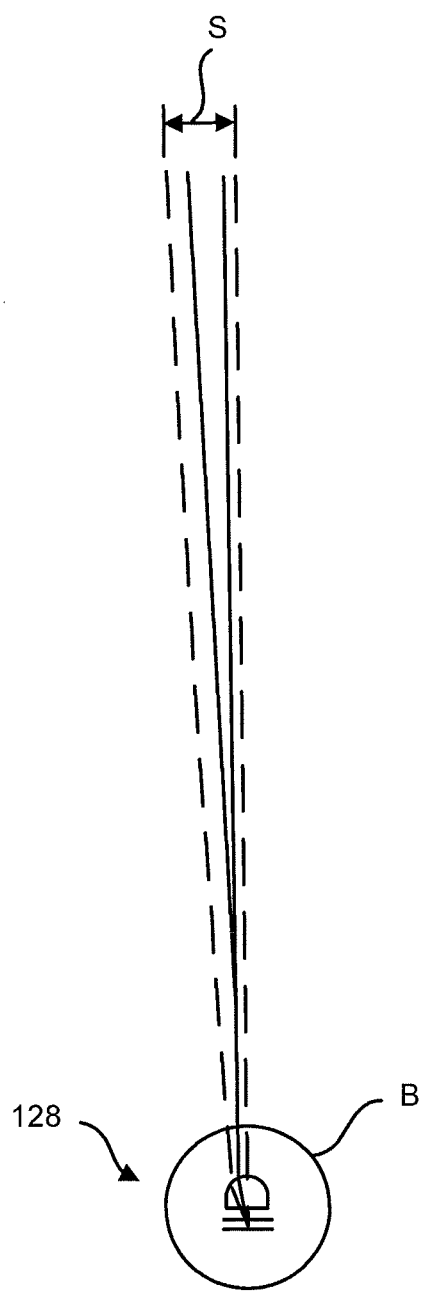
FIG. 4A shows a schematic view of an implementation of an aiming element and tracing of light rays.
Figure 4B:
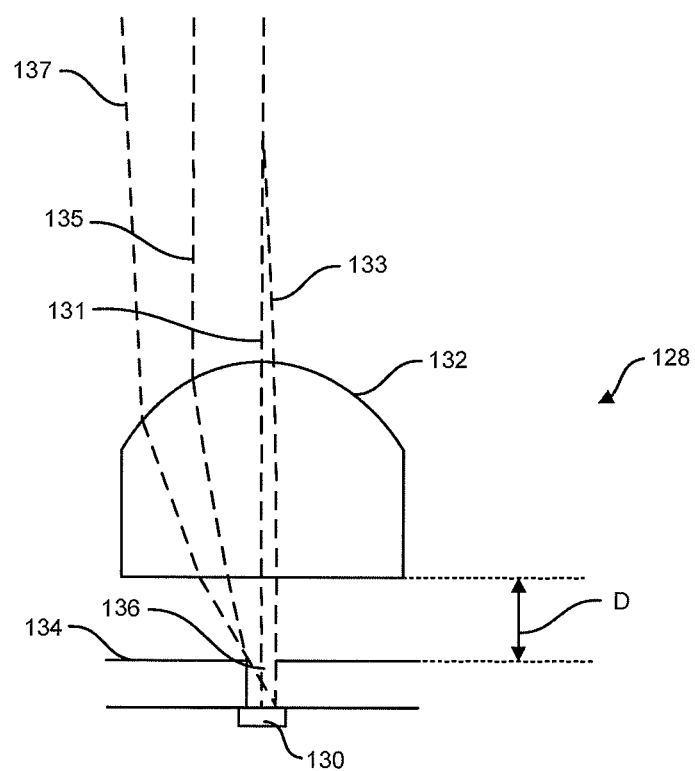
FIG. 4B shows a detailed view of the aiming element of FIG. 4A taken at circle B.
Figure 4C:
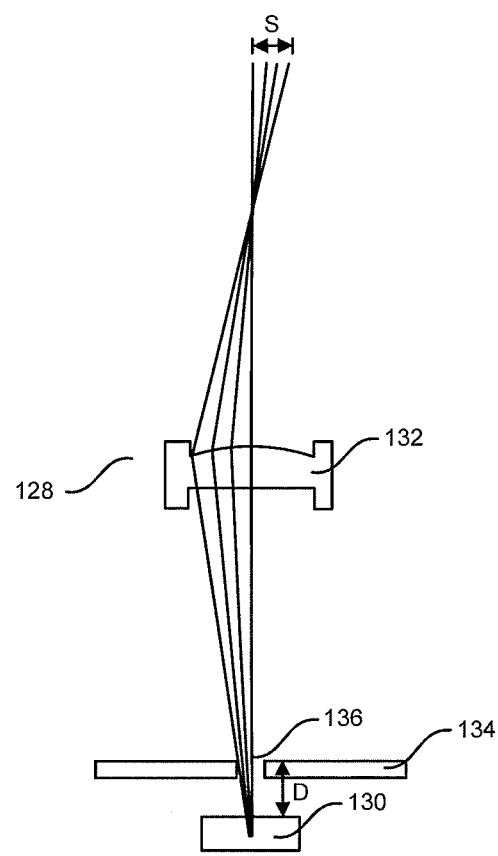
FIG. 4C shows a schematic view of another implementation of an aiming element.
Figure 5A:
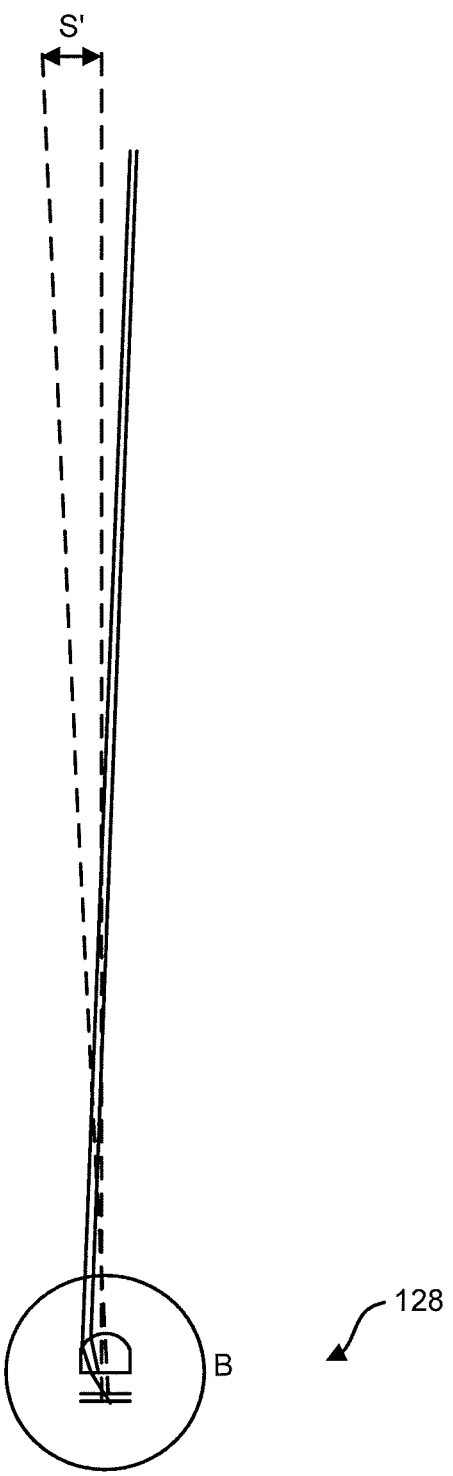
FIG. 5A shows a schematic view of an implementation of an aiming element and tracing of light rays.
Figure 5B:
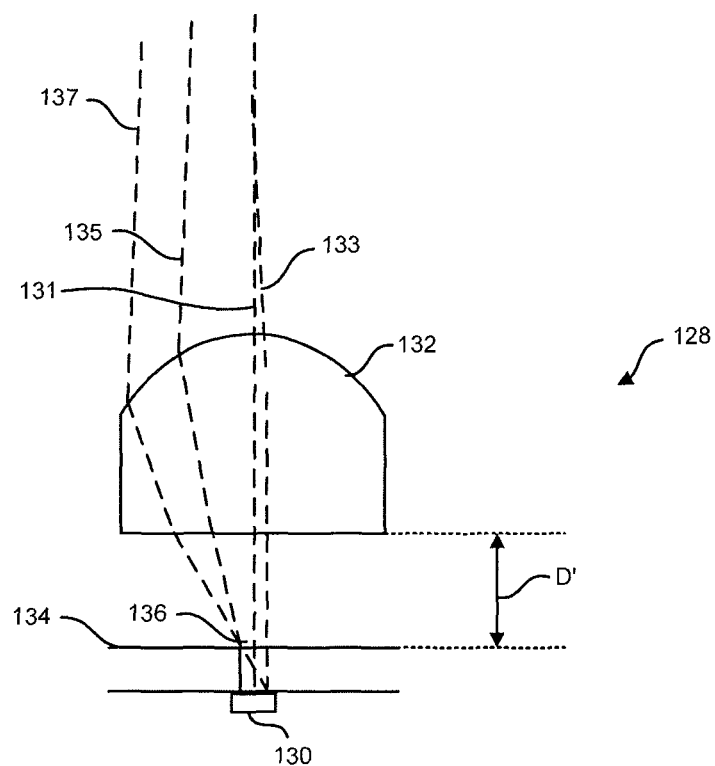
FIG. 5B shows a detailed view of the aiming element of FIG. 5A taken at circle B.
Figure 5C:
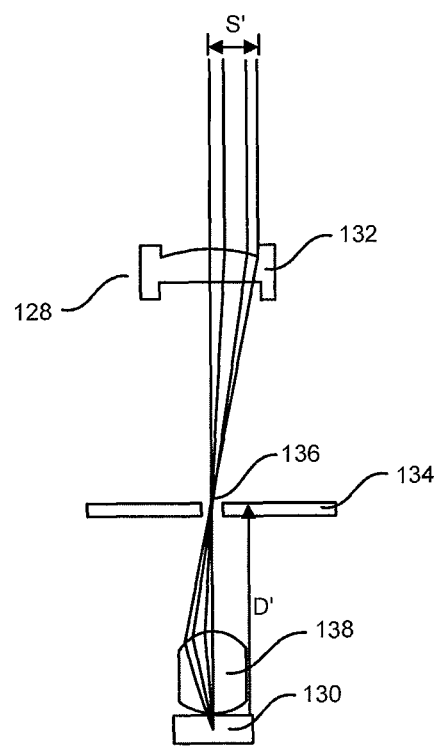
FIG. 5C shows a schematic view of another implementation of an aiming element.

FIG. 4A shows a first implementation of an aiming element 128 and FIG. 4B shows a detailed view of the aiming element 128 in FIG. 4A taken along circle B. FIG. 4C shows another implementation of an aiming element 128. FIG. 5A shows a further implementation of an aiming element 128 and FIG. 5B shows a detailed view of the aiming element 128 in FIG. 5A taken along circle B. FIG. 5C shows a further implementation of an aiming element 128. Each of the aiming elements 128 can include an aiming light source 130 (such as an LED light source), a lens 132 and a pinhole 136 extending through a pinhole element 134 positioned in between the light source 130 and the lens 132. As shown in FIG. 4A-4B, the lens 132 can be placed at its focal point relative to the aiming light source 130, which is a distance D away from the pinhole 136. The lens 132 placed at its focal point relative to the aiming light source 130 can have a measured spread S of the beam of light produced by the aiming element 128 (see FIG. 4A). In some implementations, D is about 1 mm to about 4 mm and S is about 1 mm to about 40 mm.

As shown in FIG. 4C, the lens 132 can be placed with its focal point at the pinhole 136, which is a distance D away from the light source 130. The lens 132 can also be placed with its focal point at the emissive surface of the light source 130 or at an offset relative to the light source 130. The shape of the lens 132, along with the offset of the focal point relative to the light source 130 can influence the direction of the light rays after passing through the lens 132. In the implementation shown in FIG. 4C, a collimating lens is placed with its focal point at a distance D from the emissive surface of the light source 130, causing the light rays exiting the lens 132 to converge to a point and then diverge. The light rays can have a measured spread S of the beam of light produced by the aiming element 128 (see FIG. 4A). In some implementations, D is about 1 mm to about 5 mm and S is about 1 mm to about 40 mm as measured between 0 mm and 200 mm from the most distal point on the lens surface.

The aiming element 128 in FIG. 5A-5B shows the lens 132 placed relative to the aiming light source 130 a distance D' away from the pinhole 136, which is greater than distance D and is thus, offset and unfocused. The measured spread S' of the beam of light produced by the aiming element 128 in this implementation is smaller than the measured spread S of the beam of light produced by the aiming element 128 in the implementation of FIG. 4A-4B. This smaller beam spread S' can be desirable because the aiming spot produced by the aiming element 128 is sharper and brighter. In addition, the reduced focus in the "offset focal point" implementation of FIG. 5A-5B can deliver more uniform light that obscures the individual characteristics of the aiming light source 130, which is also desirable. In some implementations, D' is about 1 mm to about 5 mm and S' is about 1 mm to about 30 mm.

The aiming element 128 in FIG. 5C shows the lens 132 placed with its focal point at the pinhole 136, a distance D' away from the light source 130, with a light pipe 138 in the path of the light rays between the light source 130 and the pinhole 136. In the implementation shown in FIG. 5C, the light pipe 138 is shaped such that the light rays pass through the focal point of the lens 132 thus approximating a point source, where if lens 132 is a collimating lens as shown, the projected light rays will project approximately parallel to one another. The measured spread S' of the beam of light produced by the aiming element 128 in this implementation is smaller than the measured spread S of the beam of light produced by the aiming element 128 in the implementation of FIG. 4C. This smaller beam spread S' can be desirable because the aiming target produced by the aiming element 128 is smaller and brighter. In addition, the light ray mixing provided by the light pipe 138 in the implementation of FIG. 5C can deliver more uniform light that obscures the individual characteristics of the aiming light source 130, which is also desirable. In some implementations, D' is about 1 mm to about 5 mm and S' is about 1 mm to about 30 mm as measured between 0 mm and 200 mm from the most distal point on the lens surface.

The ray traces illustrated in FIGS. 4A-4C and FIGS. 5A-5C illustrate four representative light rays that demonstrate the beam spread and ray interaction. IIn FIGS. 4A,4B and 5A and 5B, the four rays can include: 1) Center-Straight 131, which shows the straightest ray emanating from the center of the light source; 2) Center-Angle 135, which shows the ray passing by the pinhole edge emanating from the center of the light source; 3) Edge-Near side 133, which shows the ray passing by the nearest edge of the pinhole emanating from the outer edge of the light source; and 4) Edge-Far side 137, which shows the ray passing by the furthest edge of the pinhole emanating from the outer edge of the light source. In FIGS. 4C and 5C, the four rays are represented as emanating from an idealized point source. The implementations shown in FIGS. 4C and 5C show the ideal representation of the physics as described, but in reality many factors will affect the actual output beam of the light, including but not limited to the as-manufactured shapes of the light pipe 138, lens 132 and/or pinhole 136, shape of the light beam emanating from the light source 130, and manufacturing tolerances regarding the spacing between the components.

As mentioned above, the image enhancer device 105 can include an illuminator 115. The illuminator 115 can allow a user to provide adequate illumination on the object of interest such that the camera of the mobile device can recognize and process the object efficiently and accurately and without shadows or dark regions. In some implementations, the illumination source is a light source of the mobile device 10 such as a flash. In such implementations, a light pipe can be used to shape the light emanating from the mobile device light source. The illuminator 115 can be coupled to the image enhancer device 105 such that the illumination beam generated by the illuminator 115 can project away from the scan side 107 of the image enhancer device 105, for example through the illumination beam window 113 extending through the wall of the scan side 107 (see FIG. 2A). In some implementations, the illumination beam generated can overlap the aiming beam from the aimer 110. Again with respect to FIG. 1, the illuminator 115 can include a PCB 152 electrically coupled to an illumination element 154. It should be appreciated that the PCB 152 of the illuminator 115 can be a different PCB than the PCB 126 of the aimer 110 or the illuminator 115 and aimer 110 can be incorporated into a single PCB. The illumination element 154 can include an illumination light source 156, and optionally, a diffusing element 158 and a light pipe 160 to control the light. The illumination light source 156 of the illuminator 115 can include, for example, a light emitting diode (LED), organic light emitting diode (OLED), laser diode and the like and can be electrically connected to the PCB 152. Illumination can be of a color or spectrum of colors or set of colors including, but not limited to red, white, non-visible light or the like. The illuminator 115 can also incorporate an element that can occlude regions of the beam to generate a beam pattern. In some implementations, the shape of this beam can guide the user towards the scan location, therefore serving the role of an aiming device. Qualities of this illumination include frequency of light and brightness of light can be altered in response to external factors such as ambient illumination, color of the target, orientation of the target, distance of the target, etc.

Figure 6A:
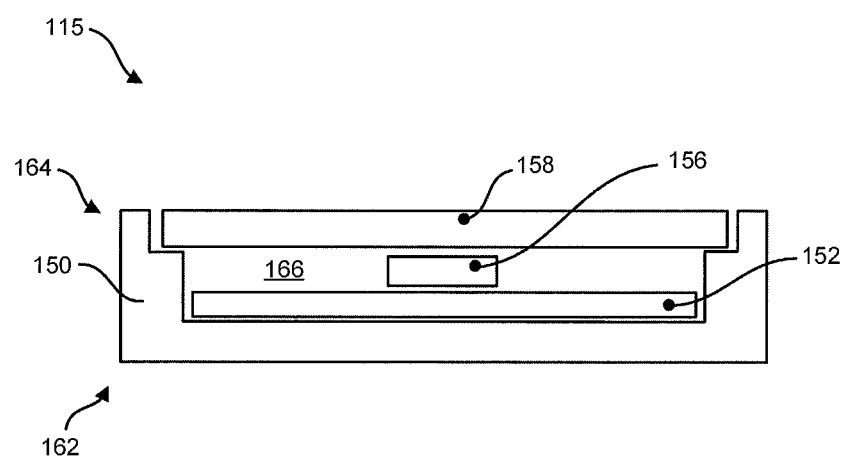
FIG. 6A shows a cross-sectional, schematic view of an implementation of an illuminator.
Figure 6B:
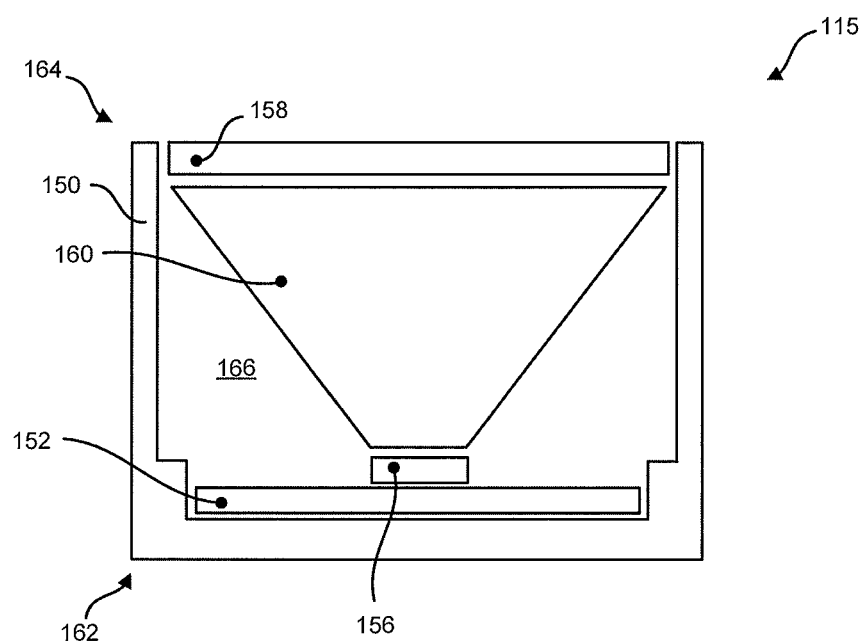
FIG. 6B shows a cross-sectional, schematic view of an implementation of an illuminator.
Figure 7D:
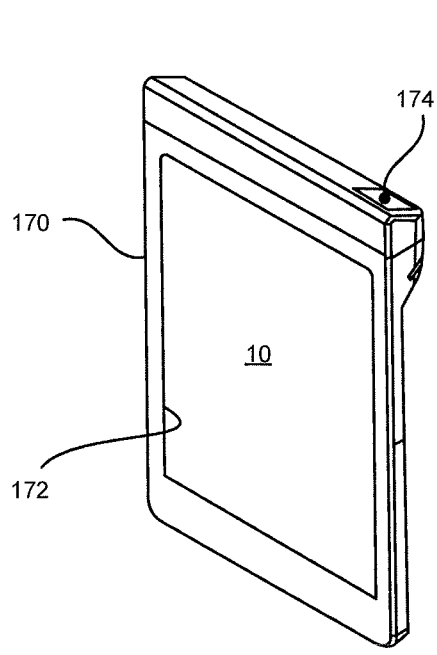
Figure 7E:
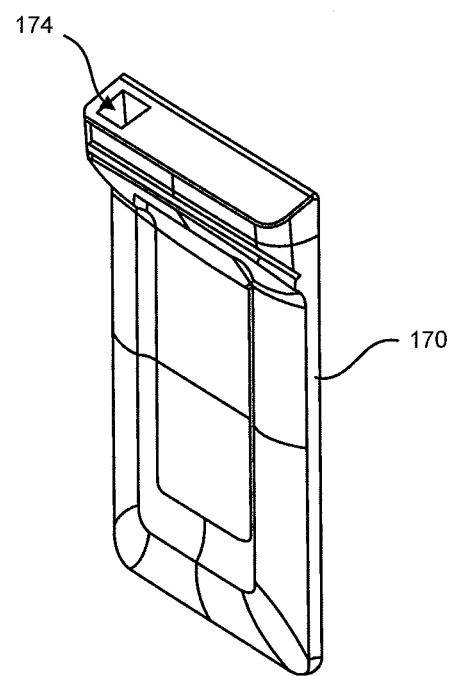

Now with respect to FIGS. 6A-6B, the illuminator 115 can be positioned within a region 150 of the housing 102 configured to hold the PCB 152 that is electrically coupled to the illumination element 154. The housing region 150 of the illuminator 115 can have a variety of configurations and shapes. The housing region 150 can have a first end 162 and a second end 164 and an interior volume 166 extending between the first end 162 and the second end 164. In some implementations, the PCB 152 can be coupled near a first end 162 of the housing region 150 and the diffusing element 158, if present, can be coupled to the second end 164 of the housing region 150 such that the interior volume 166 extends between the PCB 152 and the diffusing element 158. The illumination light source 156 can be coupled to the PCB 152 coupled to the housing region 150 near the first end 162. The illumination light source 156 can optionally be covered by the diffusing element 158 as shown in FIG. 6A and can optionally include a light pipe 160 positioned between the illumination light source 156 and the diffusing element 158, if present as shown in FIG. 6B. The light pipe 160 can have a first end positioned adjacent the illumination light source 156 and a second end positioned adjacent the diffusion element 158. Features of the light pipe 160 may include but are not limited to a first end that is planar, curved, or shaped and may additionally be smooth or textured, intermediate surfaces that may be angled to provide total internal reflection, intermediate surfaces that may be circular, square, or polygonal in cross section, a second end that may be planar, curved, or shaped, and a second end that may additionally be smooth or textured. Texture may be applied to the surfaces of the light pipe 160 and/or internal voids and/or reflective materials may be volumetrically encapsulated within the light pipe 160 to create diffusion effects. The length of the light pipe 160 and size of the first and second ends of the light pipe 160 may also be adjusted. These features and dimensions can be tuned such that the light beam exiting the illuminator 115 has a shape and distribution that creates an optimal beam for scanning. For example, shaping can allow tradeoffs between brightness and coverage to be optimized, providing either a brighter, more concentrated beam, or a broad reaching, but less intense light on the object to be scanned. As for distribution of light, having the light emissions balanced around the central axis of incoming light 122, as can be achieved with a light pipe 160 configured to provide uniform internal light distribution and an output end that is shaped as in a ring flash, can eliminate shadows. Furthermore, having the light emit out of a larger surface area, as can be achieved with a light pipe 160 configured with diffusive properties and a second end larger than the source LED, can reduce the intensity of reflections generated by the light reflected off the object to be scanned. Conversely, having the light emission concentrated to a small but intense source, as can be achieved with an LED with a small die area or with a light pipe 160 shaped to act as a concentrator, can drastically minimize the size of reflected hot spots embedded in the incoming light 122 and prevent image features such as those found in bar codes from being washed out. The housing material can be generally opaque and prevent light bleed such that light emitted from the aimer 110 and the illuminator 115 can be generally contained by the housing 102 except for that which exits the apertures 111, 113. It should be appreciated that the aimer 110, illuminator 115, and image manipulator 120 can be independently housed or grouped together in a singular housing.

As mentioned above, the devices described herein can be used with (e.g. reversibly coupled to) a mobile device such as a tablet, smartphone or other mobile computing device having a digital camera or other imaging element. The PCB(s) of the device can communicate with the electronics of the mobile device as well as the LEDs, sensors, user inputs and other peripheral enhancements. In some implementations, the devices described herein can incorporate one or more attachment elements such that the device can be reversible coupled to the mobile device in an appropriate orientation and positioned relative to the camera on the mobile device. The one or more attachment elements can be integrated with the housing of the devices described herein or the one or more attachment elements can be separate from the housing. Whether the housing of the devices described herein has an integrated attachment element(s) or the device is coupled to the mobile device by a separate attachment element(s), the device is coupled such that the optics are appropriately oriented and positioned relative to the camera/sensor of the mobile device. Because the devices described herein can be used with a wide variety of different mobile devices having varying locations for the camera/sensor, it should be appreciated that the attachment element can couple the devices described herein accordingly and is not limited to any particular arrangement.

In some implementations, the image enhancer device 105 is itself incorporated into an attachment element forming a case that can be attachable and/or detachable with the mobile device in an appropriate orientation and position relative to the camera. The case can be a case covering most of the mobile device or a smaller case that only covers a portion of the mobile device, such as just the corners and/or edges of the mobile device. The case can include additional features such as charging port(s), grips and/or peripherals such as one or more additional sensors, CC, magnetic strip readers, EMV smart card readers, biometric scanners. The case can include security and/or anti-theft features such as security hardware, keyed access, or electronic lock-outs. The case can also include features that provide protection of the mobile device 10 and/or the system 100 from shock, vibration, and fluid ingress or egress. The case can incorporate features to improve reversible coupling such as snap-on features or be formed of a material that allows for elastic deformation of the case to create a "skin" over at least a portion of the mobile device 10 such as one or more corners, faces, and edges. The case can incorporate one or more features to improve grip such as a tacky or textured surface(s). It should be appreciated that the configuration of the case can vary. The case and/or the housing 102 of the image enhancer device 105 can be formed of a polycarbonate, polyurethane, acrylonitrile butadiene styrene, or a polycarbonate-acrylonitrile butadiene styrene blend material or other material or combination of materials.

FIGS. 7A-7E illustrate an implementation of an attachment element 170 configured to couple the image enhancer device 105 to a mobile device 10 such as a tablet or smartphone. In this implementation, the attachment element 170 forms a protective case for the mobile device 10. The attachment element 170 can be configured to surround the mobile device 10 along a region of the mobile device chassis such that each side of the mobile device chassis is encased by the attachment element 170. The attachment element 170 can include a screen window 172 such that the screen of the mobile device 10 can be viewed through the attachment element 170. The attachment element 170 can include a region within which the image enhancer device 105 can be aligned with the camera of the mobile device 10. As shown best in FIG. 7C, the attachment element 170 can be coupled to at least a portion of the image enhancer device 105 such that the image enhancer device 105, the attachment element 170, and the mobile device 10 are all fixed relative to one another. Upon coupling the attachment element 170 to the mobile device 10, the scan side 107 of the image enhancer device 105 is aligned with a scan window 174 in the attachment element 170, which is configured to allow light to enter and exit the scan window 174. The scan window 174 can be an aperture in the attachment element 170 with or without a covering such as a piece of PMMA, polycarbonate, clear plastic, glass or other clear material. The scan window 174 can be one aperture window or multiple aperture windows. The camera side 109 of the image enhancer device 105 can be placed into contact with or adjacent or flush to the camera of the mobile device 10. The arrangement between the attachment element 170, the image enhancer device 105 and the mobile device 10 allow for the image manipulator 120 to direct incoming light 122 towards the camera of the mobile device 10 while outgoing light from the aiming light source and/or illumination light source can be directed at an angle relative to the mobile device 10 towards the object to be scanned or read. It should be appreciated that the configuration of the attachment element 170 can vary.

Again with respect to FIGS. 1A-1B, the imaging enhancement system 100 can include electronics 180 configured to allow for power and communication between the image enhancer device 105 and the associated mobile device 10. The electronics 180 may have embedded processors and memory, and embedded software to perform computation tasks and provide system logic. The electronics 180 may also have dedicated communication functions through the communications module 192, and dedicated power distribution and management functions through the power module 206 (see FIG. 1B). In some implementations, communication and/or power can be provided by a connector member (not shown) configured to engage the audio port, USB port, or proprietary port connector (e.g. Apple's Lightning connector) on the mobile device 10. In some implementations, the connector member is incorporated into a region of the attachment element 170 or case such that the connector member engages the mobile device port upon association of the case with the mobile device chassis.

Communication between the mobile device 10 and the image enhancement system 100 may be provided by the communication module 192 which may be resident on the electronics 180, or on a separate pcb. The audio port on the mobile device 10 can be a standardized ⅛ inch audio port. The audio port on most mobile devices is standard. The communication module 192 can provide a communication channel over the audio port, which allows the devices described herein to be generally universal and use the same core electronics across a wide range of mobile devices. Communication can be one way (mobile device talks to the device or device talks to the mobile device) or two way (mobile device may send and receive messages from the device). One or more audio channels can be used for communication in either direction between the device and the mobile computer. One or more audio channels may be dedicated to pass analog sound from the mobile device to the electronics. Communication can also occur via inaudible or audible frequencies between the mobile device speaker and/or microphone and a device speaker and/or microphone resident on the electronics 180. The devices described herein can be hardwired to the mobile device 10 via a native port of the mobile device, such that the communication interface 205 can be the audio, USB, USB-C, USB mini, USB micro, Apple's 30 pin, Apple's Lightning, or mobile device specific proprietary port. Furthermore, the electronics 180 can also be configured to communicate with the mobile device 10 via Bluetooth, WiFi, Near Field Communication (NFC), other wireless standards, RF, or light. For light based communication, data can be sent from the mobile device 10 to the electronics 180 by illuminating select pixels on the tablet screen at specific on/off frequencies, brightness's and/or colors as driven by a data protocol, the emissions of which are then received by a light sensor on the device and converted to data. Further, data can be sent from the electronics 180 to the mobile device 10 through an additional LED connected to the electronics 180 illuminating at specific on/off frequencies, brightness and/or colors as driven by a data protocol, the emissions of which are then received by the mobile device camera and converted to data.

Power management and distribution may be provided by the power module 206, which may be resident on the electronics 180, or on a separate pcb. For devices that have an external power source 207 such as in fixed kiosk applications, the power module 206 can accept power coming from external power source 207, can condition it, and can distribute it to the electronics 180 and the mobile device 10 through the power interface 204 (see path BB in FIG. 1B). For devices that do not have access to an external power source 207, the power module 206 can accept power coming from the power interface 204 on the mobile device 10, can condition it, and can distribute it to electronics 180 (see path AA in FIG. 1B). For devices using path AA, the power interface 204 can be a native port on the mobile device 10, such as the audio, USB, USB-C, USB mini, USB micro, Apple 30-pin Apple Lightning, or a mobile device specific proprietary port. For devices using path BB, power can be provided by AC, DC, and power over Ethernet (POE) sources. These power sources may have power preconditioned by external adapters such as AC/DC wall adapters or POE splitter, or may have power conditioned within the power module 206. Power conditioning may include ac/dc conversion, surge protection, noise filtering, voltage boosting, or stepping down of high voltage sources. When distributing power to the mobile device 10, the power module 206 may contain current set resistors or other such features to facilitate electronic handshakes that permit mobile devices to receive full power output.

The power module 206, the image enhancer device 105 and/or the entire imaging enhancement system 100 can harvest power from the signal exiting the mobile device 10 through the audio port from any of the audio channels. This power harvesting can occur simultaneously with unidirectional or bidirectional communication. The data protocol can include one or more of FSK, PSK, QAM, RS-232 and the like. The communication and/or power transmission between the mobile device 10 and the devices described herein can be aided through hardware and software filters, for example high-pass, low-pass, band-pass, Butterworth, level shifting, AC coupling, RC, tuning circuit, DC bias, band-stop, and the like. Energy harvesting (e.g. from the audio port, as well as thermal, electromagnetic, solar, and mechanical) eliminates the need for an external power source or onboard power storage, such as a battery, that is sized to last the full duration between charges. The energy harvested can be used in real time, or may be contained within a super capacitor or battery. Implementations using super capacitors may simplify the power architecture and reduce size, cost, and weight for power related electronic components. It should be appreciated that the device 105 and/or system 100 can be configured to receive power from a dedicated battery as opposed to harvesting power from the mobile device 10. Additionally, configurations compatible with a variety of power peripherals such as charging stations, battery packs, inductive charging, wireless charging, etc. can be incorporated such that they are integrated into the communication and/or power architecture of the electronics 180.

Again with respect to FIGS. 1A-1B, the imaging enhancement system 100 can include one or more sensors 190, including proximity sensors, touch sensors, capacitive sensors, and the like. In some implementations, the proximity sensor can be configured to sense when an object, such as a bar code, is brought in close proximity to the image enhancer device 105. For example, the proximity sensor can sense when the object is brought within the FOV of the image manipulator 120, within the illuminated region emanating from the illuminator 115 of the image enhancer device 105, or within the beam of the aimer 110 of the image enhancer device 105, or within proximity to the scan window 174. The information provided by the proximity sensor can be used to start, influence, or as an input to some portion of the scanning process. The type of proximity sensor can vary including, but not limited to IR/photodiode, radar, LIDAR, stereo camera, motion sensing, structured light, acoustic and the like. The proximity sensor can be a dedicated sensor such as an IR/LED—photo diode combination, or it can be image-based as in using the mobile device camera and motion detect algorithms. The external proximity sensor can be used to provide distance information to the camera to support focus. The proximity sensor can be dedicated hardware or the system may leverage sensing features of the mobile device camera as well. The system may also include informed decision making beyond focus, such as motion detection. The motion detection algorithm can preserve the camera autofocus mechanism (from life cycling) and reduce power consumption (e.g. run in a lower power state when there is no object to scan). Thus, the proximity sensor can extend beyond the hardware to include intelligence in the camera on the mobile device. Mobile device cameras can have a precise range sensing built in (e.g. "focus pixels" on iPhone 6 provide phase detect autofocus) that can be leveraged by the devices and systems described herein.

Again with respect to FIGS. 1A-1B, the aimer 110 and the illuminator 115 can include circuit boards 126, 152 that can electrically connect to electronics 180. The electronics 180 can include a main circuit board (not shown) and be configured to connect to one or more of the sensors 190, a transmitter/receiver 192, and any inputs 194 or outputs 196 within the system 100 as well as communicate with the mobile device 10. For example, the devices described herein can also include one or more inputs 194 such as an external button, key, capacitive switch, or other input for user control as well as one or more outputs 196 such as for example a light or other indicator indicating the device power and operational status, a vibrational motor for user feedback, or a piezo buzzer to sound a tone upon a successful scan. In some implementations, the imaging enhancement system 100 can include an input 194 such that the image enhancer device 105 can be directly controlled to scan as opposed to controlled through the mobile device 10 or a software application running on the mobile device 10. The input 194 can be positioned relative to the image enhancer device 105 and/or to the associated mobile device 10 such that a user can easily hold the mobile device with a single hand and operate the input 194 with a single hand in an intuitive manner that is also ergonomically correct. The electronics 180 can further contain embedded firmware, electronics and/or dedicated IC's to provide extended capabilities in the system. Examples include IC's that provide locational awareness, NFC tags that enable interactions and payment workflows, and depth sensors that are able to understand gestures and movement.

The devices described herein can be optimized for use in various settings including, but not limited to a commercial or public setting. For example, the devices described herein can have a ruggedized design that provides some form of protection against things such as but not limited to: mechanical shock, fluid ingress, humidity, temperature variation, static or other electrical shocks, food, grease, and/or other unwanted materials. Ruggedized design of one or more of the features of the devices described herein can prevent damage to components including but not limited to, the screen, camera, lens, buttons, connection ports or any other external or internal feature of the mobile device as well as components of the devices described herein. The devices described herein can include access or hardware to simplify or enable various types of charging methods, such as but not limited to docking stands, external battery packs, pogo pins, charging cables, charging ports, or wireless charging methods such as induction. The devices described herein can include features to improve ergonomics, such as but not limited to: grips, handles, access points, left or right handed user features, features to aid in displaying the screen from the user to another person (for example from an associate to a customer), distributed weighting to provide balance or heft. The devices described herein can provide material, color, icon or image selection to provide guidance for use. The devices described herein can provide aesthetic to match, enhance, or complement the aesthetic of the location of use. The devices described herein can provide features as appropriate for field access for things such as, but not limited to upgrades, repairs, alterations, part replacement, peripheral replacement, and peripheral changing.

In some implementations, provided herein is an image enhancer device for use with a mobile electronic device having a digital camera, the image enhancer device includes an aimer having an aiming element configured to direct at least one aiming light beam away from a first region of the device towards the object of interest. The image enhancer device includes an illuminator having an illumination element configured to direct at least one illumination light beam away from the first region of the device towards the object of interest. The image enhancer device includes an image manipulator configured to modify an optical path of the digital camera. In some implementations, the device includes an image manipulator. In other implementations, the device includes the image manipulator and an aimer. In still other implementations, the device includes the image manipulator and the illuminator. In other implementations, the device includes the image manipulator, the aimer and the illuminator. In further implementations, the device includes the image manipulator and the aimer, wherein the aimer additionally provides illumination. In still further implementations, the device includes the image manipulator and an illuminator bounded by an aperture to provide clear aiming direction. In some implementations, the device need not include an aimer.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

What is claimed:

1. An image enhancer device for use with an associated mobile electronic device having a digital camera, the image enhancer device comprising:
   a housing removably attachable to the mobile electronic device;
   an image manipulator coupled to a first region of the housing configured to receive incoming light from an object of interest along a first axis and to modify an optical path of the digital camera;
   an aimer having an aiming element configured to direct at least one aiming light beam towards the object of interest along the first axis, wherein the aiming element comprises an aiming light source, a light pipe, a pinhole element defining a pinhole and a lens each centrally aligned with one another, wherein the aiming light source emits diffuse light that is captured by the light pipe and concentrated from a first beam profile that is wider than the pinhole to a second beam profile that is sized for passage through the pinhole towards the lens;
   an illuminator having an illumination element configured to direct at least one illumination light beam from the housing towards the object of interest; and
   electronics allowing for communication between the image enhancer device and the associated mobile electronic device,
   wherein the image enhancer device forms a scan angle relative to a field of view of the digital camera of the mobile electronic device to enable the mobile electronic device to perform native image processing including bar code decoding with the digital camera of the mobile electronic device.

2. The device of claim 1, wherein the aiming element includes a first LED light source, the illuminator element includes a second LED light source, and the image manipulator has a first mirrored surface.

3. The device of claim 1, wherein the electronics allow for communication from the associated mobile electronic device through a native port on the associated mobile electronic device, the native port being an audio port, a lightning port, or a USB port.

4. The device of claim 3, wherein the electronics further allow for harvesting of energy through the native port.

5. The device of claim 4, wherein the harvested energy is stored in a super capacitor of the device.

6. The device of claim 1, wherein the communication is bi-directional over an audio port on the associated mobile electronic device.

7. The device of claim 1, wherein the image manipulator receives light directed towards the first region of the housing from the object of interest and reflects the light towards a second region of the housing, and optionally, wherein the first region and the second region of the housing are arranged at an angle to one another.

8. The device of claim 1, wherein the aimer directs the at least one aiming light beam from the first region of the housing through an aperture in the housing, and optionally, wherein incoming light is directed toward the image manipulator and reflects at an angle relative to the incoming light into a lens or image sensor of the digital camera of the associated mobile electronic device.

9. The device of claim 1, wherein the first region of the housing allows incoming light to reflect onto the image manipulator and allowing outgoing light from the aimer and the illuminator to exit the housing and toward the object of interest.

10. The device of claim 7, wherein a surface of the second region is positionable relative to the chassis of the associated mobile electronic device such that the image manipulator is generally centered and aligned over the lens or image sensor of the digital camera of the associated mobile electronic device and the first region faces at an angle to the chassis such that the at least one aiming light beam and the at least one illuminating light beam are directed away from the device and toward the object of interest.

11. The device of claim 10, wherein when the second region of the housing is positioned relative to the chassis of the mobile device and optically aligned with the camera, the first region of the housing is oriented such that incoming light directed towards the image enhancer device reflects onto the image manipulator and is redirected towards the digital camera of the associated mobile electronic device.

12. The device of claim 1, wherein the at least one aiming light beam is emitted through an aimer aperture extending through a wall in the housing of the device on the first region of the housing, and optionally, wherein the at least one illumination light beam is emitted through an illuminator aperture extending through the wall of the housing, wherein the illuminator aperture and the aimer aperture can be the same or different apertures.

13. The device of claim 12, wherein a plane of the aimer aperture and a plane of the illuminator aperture are the same plane, parallel planes, or non-parallel planes, and wherein an angle is formed between a plane of the second region of the housing and the planes of the aimer aperture and the illuminator aperture.

14. The device of claim 13, wherein the angle is at least about 15°, 20°, 25°, 30°, 35°, 40°, 45°, 50°, 55°, 60°, 65°, 70°, 75°, 80°, 85°, 90°, 95° or greater degrees.

15. The device of claim 13, wherein the angle is fixed or mechanically adjustable.

16. The device of claim 1, wherein incoming light is redirected by the image manipulator at an angle that is about 15°, 20°, 25°, 30°, 35°, 40°, 45°, 50°, 55°, 60°, 65°, 70°, 75°, 80°, 85°, 90°, 95° degree angle from an original direction.

17. The device of claim 1, wherein the scan angle is 90 degrees from a direction that the digital camera is facing.

18. The device of claim 1, wherein the aimer is housed within an interior volume of the housing and the aiming element comprises a lens, a pinhole element defining a pinhole, and an aiming light source coupled to a printed circuit board, wherein the lens of the aiming element is oriented near the first region of the housing a distance away from the pinhole element, the pinhole element is coupled to or integrated with an inner surface of the housing between the lens and the aiming light source, and wherein the lens, pinhole and aiming light source are each centrally aligned.

19. The device of claim 18, wherein the aiming element further comprises a diffuser positioned between the pinhole element and the aiming light source.

20. The device of claim 18, wherein the lens of the aiming element has a first focal point that is placed at the pinhole and wherein the aiming light source has a second focal point that is different from the first focal point of the lens such that the aiming light beam from the aiming element is defocused.

21. The device of claim 1, wherein the aiming element directs the at least one aiming light beam towards the object of interest parallel to the first axis.

22. The device of claim 1, wherein the lens has a first focal point that is placed at the pinhole and wherein the second beam profile sized for passage through the pinhole forms a second focal point that is different from the first focal point such that the aiming light beam is defocused.

23. An image enhancer device for use with an associated mobile electronic device having a digital camera, the image enhancer device comprising:
  an image manipulator configured to receive incoming light from an object of interest along a first axis and to modify an optical path of the digital camera;
  an aimer having an aiming element configured to direct at least one aiming light beam towards the object of interest along the first axis, wherein the aiming element comprises an aiming light source, a light pipe, a pinhole element defining a pinhole and a lens each centrally aligned with one another, wherein the aiming light source emits diffuse light that is captured by the light pipe and concentrated from a first beam profile that is wider than the pinhole to a second beam profile that is sized for passage through the pinhole towards the lens; and
  electronics allowing for communication between the image enhancer device and the associated mobile electronic device, the electronics powering the aimer,
  wherein the image enhancer device forms a scan angle relative to a field of view of the digital camera of the mobile electronic device to enable the mobile electronic device to perform native image processing including bar code decoding with the digital camera of the mobile electronic device, wherein the image enhancer device is removably attachable to the mobile electronic device.

24. The image enhancer device of claim 23, wherein the aiming element directs the at least one aiming light beam towards the object of interest parallel to the first axis.

25. The image enhancer device of claim 23, further comprising an illuminator having an illumination element configured to direct at least one illumination light beam towards the object of interest, wherein the illuminator is powered by the electronics.

26. An image enhancer device for use with an associated mobile electronic device having a digital camera, the image enhancer device comprising:
  an image manipulator configured to receive incoming light from an object of interest along a first axis and to modify an optical path of the digital camera; and
  an aimer having an aiming element configured to direct at least one aiming light beam towards the object of interest along the first axis, wherein the aiming element comprises an aiming light source, a light pipe, a pinhole element defining a pinhole and a lens each centrally aligned with one another, wherein the aiming light source emits diffuse light that is captured by the light pipe and concentrated from a first beam profile that is wider than the pinhole to a second beam profile that is sized for passage through the pinhole towards the lens,
  wherein the image enhancer device forms a scan angle relative to a field of view of the digital camera of the mobile electronic device to enable the mobile electronic device to perform native image processing including bar code decoding with the digital camera of the mobile electronic device and is removably attachable to the mobile electronic device
  wherein the aimer is powered by the associated mobile electronic device.

27. The image enhancer device of claim 26, wherein the aiming element directs the at least one aiming light beam towards the object of interest parallel to the first axis.

28. The image enhancer device of claim 26, wherein illumination of the object of interest is provided by a light source of the associated mobile electronic device.

29. The image enhancer device of claim 26, further comprising an illuminator having an illumination element configured to direct at least one illumination light beam towards the object of interest, wherein the illuminator is powered by the associated mobile electronic device.

* * * * *